United States Patent
Koudo et al.

(10) Patent No.: US 10,467,968 B2
(45) Date of Patent: Nov. 5, 2019

(54) LIQUID CRYSTAL DISPLAY DEVICE

(71) Applicant: Panasonic Liquid Crystal Display Co., Ltd., Himeji-shi, Hyogo (JP)

(72) Inventors: Toshikazu Koudo, Hyogo (JP); Hideyuki Nakanishi, Hyogo (JP); Katsuhiro Kikuchi, Hyogo (JP)

(73) Assignee: Panasonic Liquid Crystal Display Co. Ltd., Hyogo (JP)

( * ) Notice: Subject to any disclaimer, the term of this patent is extended or adjusted under 35 U.S.C. 154(b) by 23 days.

(21) Appl. No.: 15/900,376

(22) Filed: Feb. 20, 2018

(65) Prior Publication Data

US 2018/0286325 A1 Oct. 4, 2018

(30) Foreign Application Priority Data

Mar. 30, 2017 (JP) .................................. 2017-068356

(51) Int. Cl.
*G09G 3/36* (2006.01)
*G06T 5/00* (2006.01)
*G06T 5/20* (2006.01)

(52) U.S. Cl.
CPC .............. *G09G 3/36* (2013.01); *G06T 5/002* (2013.01); *G06T 5/20* (2013.01); *G09G 3/3607* (2013.01); *G09G 3/3688* (2013.01); G09G 2300/023 (2013.01); G09G 2320/0276 (2013.01); G09G 2360/04 (2013.01); G09G 2360/16 (2013.01)

(58) Field of Classification Search
CPC ...... G09G 3/36; G09G 3/3607; G09G 3/3688; G09G 2300/023; G09G 2320/0276; G09G 2360/04; G09G 2360/16; G06T 5/002; G06T 5/20
See application file for complete search history.

(56) References Cited

U.S. PATENT DOCUMENTS

2007/0262985 A1* 11/2007 Watanabe ............... G06T 5/008
345/420
2008/0240598 A1* 10/2008 Hasegawa ................ G06T 5/40
382/254
2016/0170702 A1* 6/2016 Jiang .................. G02F 1/133528
345/618

FOREIGN PATENT DOCUMENTS

JP 2008-191269 8/2008

* cited by examiner

*Primary Examiner* — Grace Q Li
(74) *Attorney, Agent, or Firm* — Hamre, Schumann, Mueller & Larson, P.C

(57) ABSTRACT

A liquid crystal display device includes: a first display panel displaying a first image; a second display panel displaying a second image; and an image processor generating first and second image data based on input video signal. The image processor includes a first differential filtering processor, a multiplier that multiplies a grayscale of the image data subjected to the differential filtering by the first differential filtering processor by a correction coefficient, and a first smoothing processor that performs smoothing processing on image data obtained by adding the image data multiplied by the correction coefficient and the image data based on the input video signal. The image processor generates the first image data based on the image data based on the input video signal and the image data subjected to the smoothing processing, and generates the second image data based on the image data subjected to the smoothing processing.

8 Claims, 22 Drawing Sheets

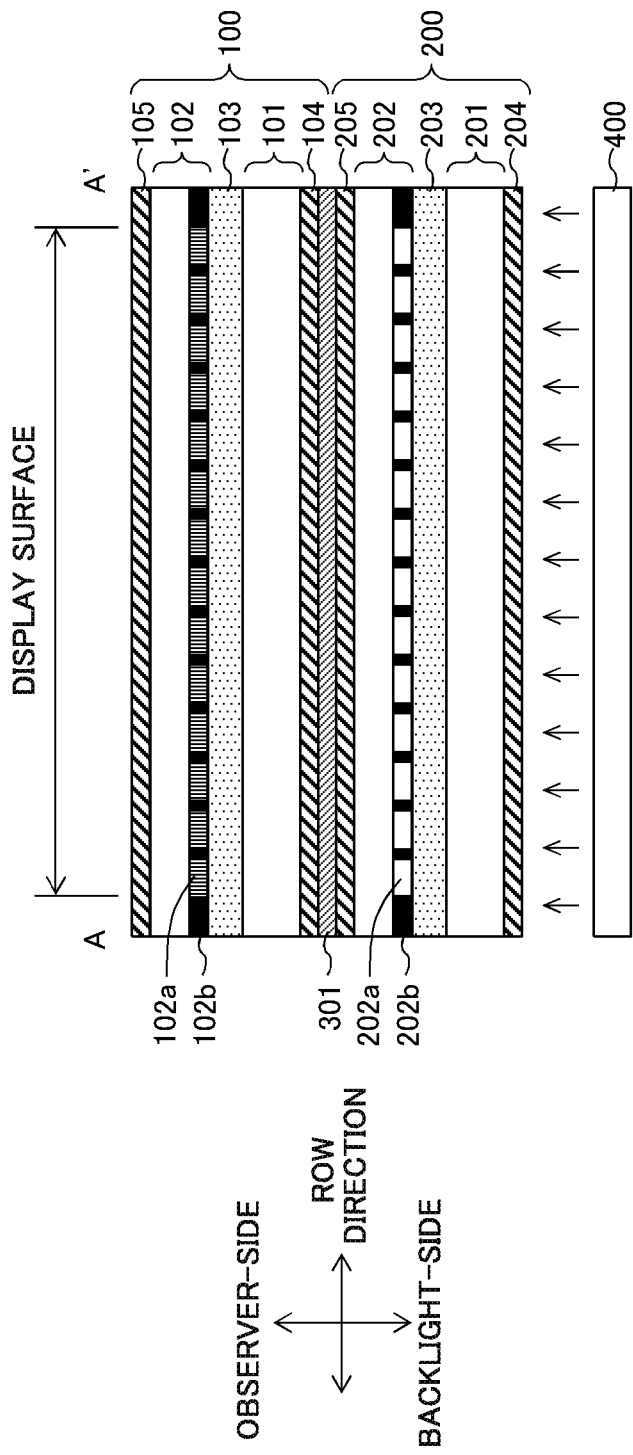

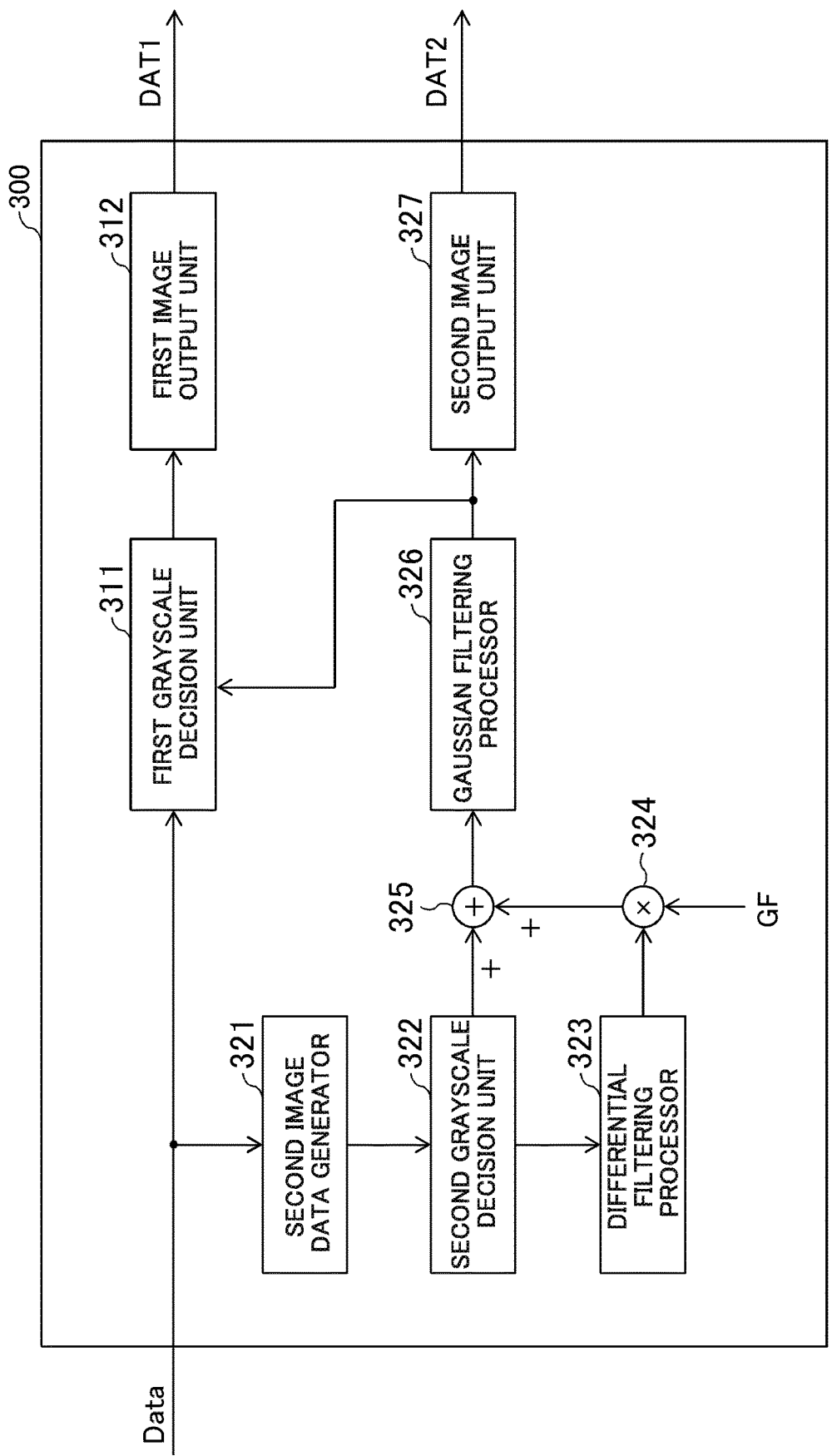

FIG.8

PEAK LUMINANCE

BRIGHT-LINE IMAGE
(ONE PIXEL COLUMN)

GAIN FACTOR GF CALCULATED POSITION

LIQUID CRYSTAL DISPLAY DEVICE

CROSS-REFERENCE TO RELATED APPLICATION

This application claims priority from Japanese application JP 2017-068356, filed Mar. 30, 2017. This Japanese application is incorporated herein by reference.

TECHNICAL FIELD

A present invention relates to a liquid crystal display device.

BACKGROUND

A technique, in which two display panels overlap each other and an image is displayed on each display panel based on an input video signal, is conventionally proposed to improve contrast of a liquid crystal display device (for example, see Unexamined Japanese Patent Publication No. 2008-191269). Specifically, for example, a color image is displayed on a front-side (observer-side) display panel in two display panels disposed back and forth, and a black-and-white image is displayed on a rear-side (backlight-side) display panel, thereby improving contrast. In the liquid crystal display device, smoothing processing of spreading locally a portion having a high signal level of the input video signal by several pixels is performed on the video signal supplied to the rear-side display panel in order to reduce a display defect caused by parallax.

SUMMARY

However, in the conventional liquid crystal display device, because the smoothing processing is performed by an m pixel-by-m pixel smoothing size, luminance corresponding to image data output to the rear-side display panel is lower than luminance corresponding to the input video signal, and display quality is degraded.

The present disclosure is made in view of the above circumstances, and an object of the present disclosure is to prevent the degradation of luminance to improve the display quality in a liquid crystal display device in which a plurality of display panels overlap each other.

To solve the above problem, a liquid crystal display device according to the present disclosure comprises: a first display panel that displays a first image; a second display panel that displays a second image and is opposed to the first display panel; and an image processor that generates first image data corresponding to the first image and second image data corresponding to the second image based on input video signal. The image processor includes a first differential filtering processor that performs differential filtering of detecting a boundary at which luminance changes in input image data derived from the input video signal, a multiplier that multiplies a grayscale of the image data subjected to the differential filtering by the first differential filtering processor by a correction coefficient settable to a desired value, and a first smoothing processor that performs smoothing processing on image data obtained by adding the image data multiplied by the correction coefficient and the input image data. The image processor generates the first image data based on the input image data and the image data subjected to the smoothing processing, and generates the second image data based on the image data subjected to the smoothing processing.

In the liquid crystal display device according to the present disclosure, the first smoothing processor may perform the smoothing processing on the image data based on the input video signal using a mean filter having a filter coefficient that becomes a normal distribution.

In the liquid crystal display device according to the present disclosure, the image processor may further include a correction coefficient calculator that calculates the correction coefficient such that peak luminance of the image data based on the input video signal is equal to peak luminance of the second image data.

In the liquid crystal display device according to the present disclosure, a grayscale distribution of the second image data may include a first region in which luminance is substantially equal to peak luminance of the image data based on the input video signal and second regions on right and left sides of the first region, luminance of the second regions being higher than the peak luminance, and a width in which the first region and the second regions are added is substantially equal to a width of the peak luminance in the grayscale distribution of the second image data.

In the liquid crystal display device according to the present disclosure, the correction coefficient calculator may include an extension filtering processor that performs extension filtering on the image data based on the input video signal with a region including a target pixel and pixels around the target pixel as a filter size, a maximum value of luminance in the filter size being set to luminance of the target pixel in the extension filtering.

In the liquid crystal display device according to the present disclosure, the correction coefficient calculator may include a second differential filtering processor that performs the differential filtering on the image data based on the input video signal, a second smoothing processor that performs the smoothing processing on the image data subjected to the differential filtering by the second differential filtering processor, a third smoothing processor that performs the smoothing processing on the image data based on the input video signal, an adder that adds a grayscale of the image data subjected to the smoothing processing by the third smoothing processor and a grayscale of the image data subjected to the extension filtering, and a divider that divides the grayscale of the image data added, by a grayscale of the image data subjected to the smoothing processing by the second smoothing processor, and the correction coefficient calculator may set a calculation result of the divider to the correction coefficient.

The liquid crystal display device according to the present disclosure may further comprise: a first grayscale decision unit that decides a grayscale of the first image data according to a gamma characteristic of the first display panel based on the input video signal; and a second grayscale decision unit that decides a grayscale of the second image data according to a gamma characteristic of the second display panel based on the input video signal, wherein the first differential filtering processor may perform the differential filtering on the image data in which the grayscale is decided by the second grayscale decision unit, the correction coefficient calculator may include a second differential filtering processor that performs the differential filtering on the image data in which the grayscale is decided by the second grayscale decision unit, a second smoothing processor that performs the smoothing processing on the image data subjected to the differential filtering by the second differential filtering processor, a third smoothing processor that performs the smoothing processing on the image data in which the grayscale is decided by the second grayscale decision unit, an extension filtering processor that performs extension filtering on the image data in which the grayscale is decided by the second grayscale decision unit such that a maximum value of luminance in a filter size is set to luminance of a target pixel with a region including a target pixel and pixels around the target pixel as the filter size, value of luminance in the filter size being set to luminance of the target pixel, an adder that adds the grayscale of the image data subjected to the smoothing processing by the third smoothing processor and the grayscale of the image data subjected to the extension filtering, and a divider that divides the grayscale of the image data added, by the grayscale of the image data subjected to the smoothing processing by the second smoothing processor. The correction coefficient calculator may set a calculation result of the divider to the correction coefficient, and the first smoothing processor may perform the smoothing processing on image data obtained by adding the image data multiplied by the correction coefficient by the multiplier and the image data in which the grayscale is decided by the second grayscale decision unit.

The liquid crystal display device according to the present disclosure may further comprises: a first grayscale decision unit that decides a grayscale of the first image data according to a gamma characteristic of the first display panel based on the input video signal; and a second grayscale decision unit that decides a grayscale of the second image data according to a gamma characteristic of the second display panel based on the input video signal, wherein the first differential filtering processor may perform the differential filtering on the image data in which the grayscale is decided by the second grayscale decision unit, the correction coefficient calculator may include a second differential filtering processor that performs the differential filtering on the image data in which the grayscale is decided by the second grayscale decision unit, a second smoothing processor that performs the smoothing processing on the image data subjected to the differential filtering by the second differential filtering processor, a third smoothing processor that performs the smoothing processing on the image data in which the grayscale is decided by the second grayscale decision unit, an extension filtering processor that performs extension filtering on the image data based on the input video signal before the grayscale is decided by the second grayscale decision unit such that a maximum value of luminance in a filter size is set to luminance of a target pixel with a region including a target pixel and pixels around the target pixel as the filter size, an adder that adds the grayscale of the image data subjected to the smoothing processing by the third smoothing processor and the grayscale of the image data subjected to the extension filtering, and a divider that divides the grayscale of the image data added, by the grayscale of the image data subjected to the smoothing processing by the second smoothing processor. The correction coefficient calculator may set a calculation result of the divider to the correction coefficient, and the first smoothing processor may perform the smoothing processing on image data obtained by adding the image data multiplied by the correction coefficient by the multiplier and the image data in which the grayscale is decided by the second grayscale decision unit.

In the liquid crystal display device according to the present disclosure, the smoothing processing may be Gaussian filtering.

BRIEF DESCRIPTION OF THE DRAWINGS

FIG. 4 is a sectional view taken along a line A-A' in FIGS. 2 and 3;

FIG. 6 is a block diagram illustrating a specific configuration of an image processor according to an exemplary embodiment;

FIG. 8 is a view illustrating an example of Gaussian filter;

DETAILED DESCRIPTION

Hereinafter, exemplary embodiments of the present disclosure will be described with reference to the drawings. A liquid crystal display device according to the present exemplary embodiment includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. There is no limitation to a number of display panels, but it is only necessary to provide at least two display panels. When viewed from an observer side, the plurality of display panels are disposed while overlapping each other in a front-back direction. An image is displayed on each of the display panels. Liquid crystal display device 10 including two display panels will be described below by way of example.

Figure 1:
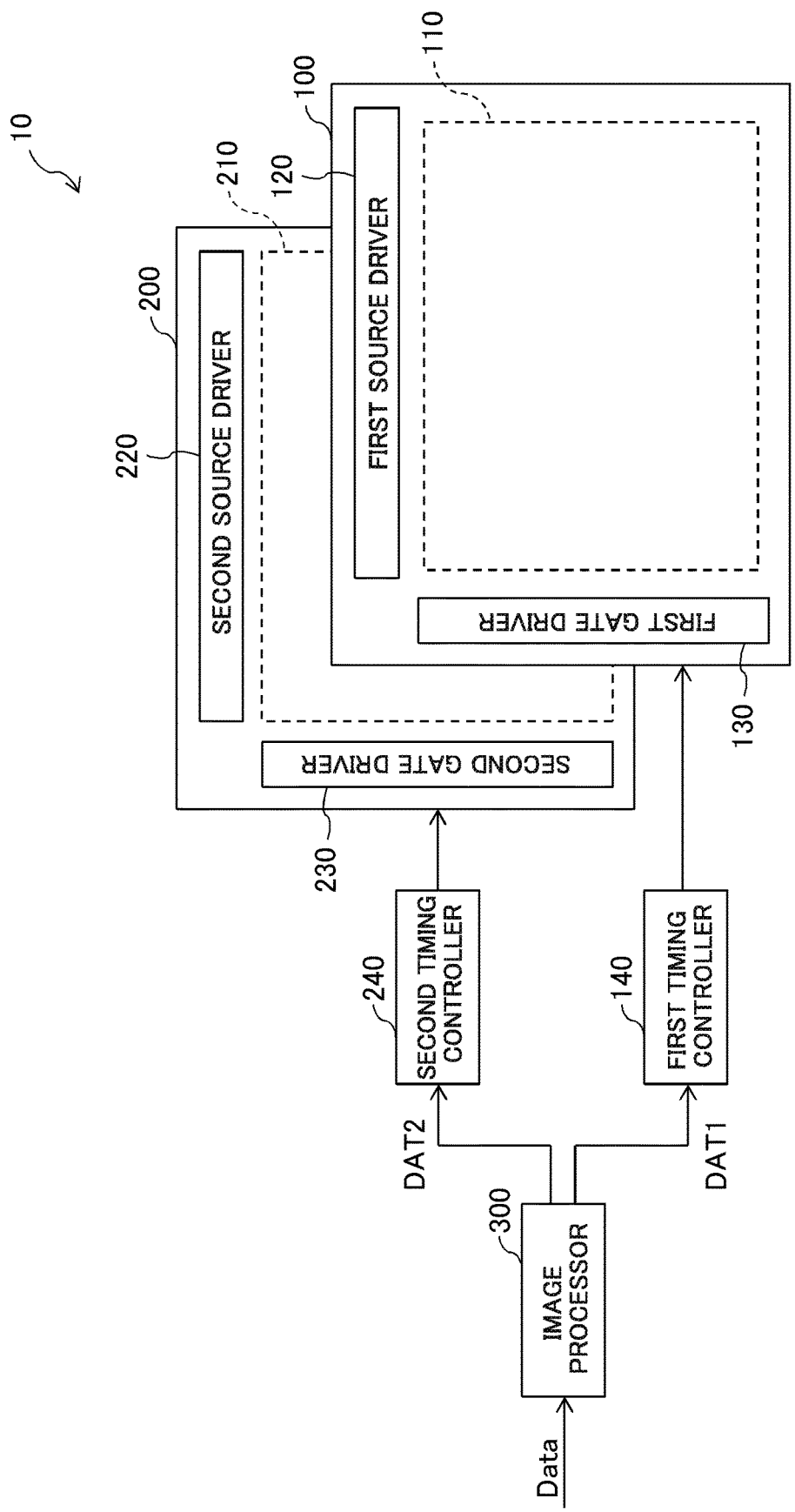
FIG. 1 is a plan view illustrating a schematic configuration of a liquid crystal display device according to the present exemplary embodiment.

FIG. 1 is a plan view illustrating a schematic configuration of liquid crystal display device 10 according to the present exemplary embodiment. As illustrated in FIG. 1, liquid crystal display device 10 includes display panel 100 disposed closer to an observer (front side), display panel 200 disposed farther away from the observer (rear side) than display panel 100, first timing controller 140 that controls first source drivers 120 and first gate drivers 130, first source drivers 120 and first gate drivers 130 being provided in display panel 100, second timing controller 240 that controls second source drivers 220 and second gate drivers 230, second source drivers 220 and second gate drivers 230 being provided in display panel 200, and image processor 300 that outputs image data to first timing controller 140 and second timing controller 240. Display panel 100 displays a color image in first image display region 110 according to the input video signal, and display panel 200 displays a monochrome image in second image display region 210 according to the input video signal. Image processor 300 receives input video signal Data transmitted from an external system (not illustrated), performs image processing (to be described later) on input video signal Data, outputs first image data DAT1 to first timing controller 140, and outputs second image data DAT2 to second timing controller 240. Image processor 300 also outputs a control signal (not illustrated in FIG. 1) such as a synchronizing signal to first timing controller 140 and second timing controller 240. First image data DAT1 is image data for displaying the color image, and second image data DAT2 is image data for displaying the monochrome image. It is also possible that display panel 100 may displays a monochrome image in first image display region 110 and display panel 200 may display a monochrome image in second image display region 210. A backlight (not illustrated in FIG. 1) is disposed on a rear surface side of display panel 200. A specific configuration of image processor 300 will be described later.

Figure 2:
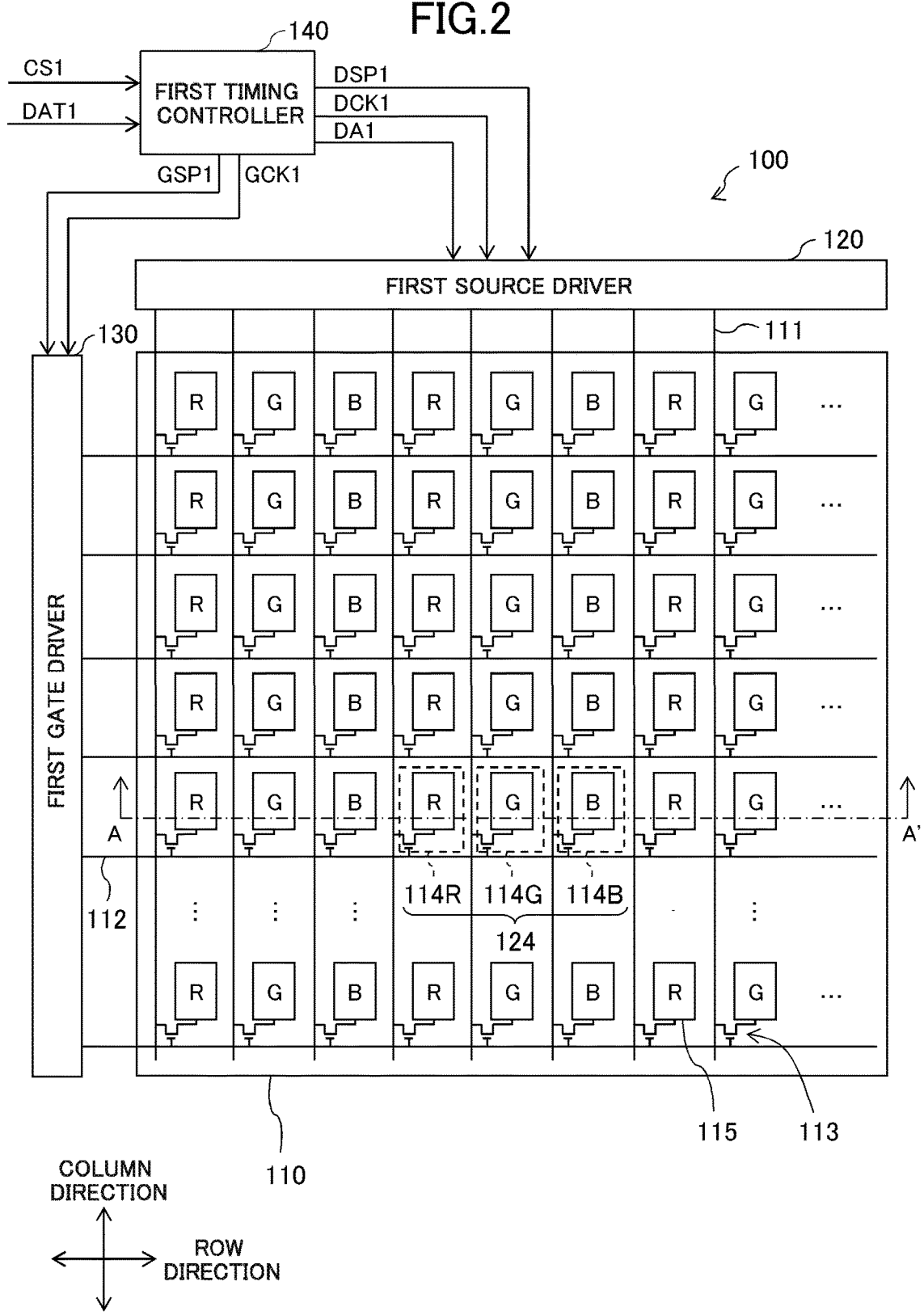
FIG. 2 is a plan view illustrating a schematic configuration of a front-side display panel according to the present exemplary embodiment.
Figure 3:
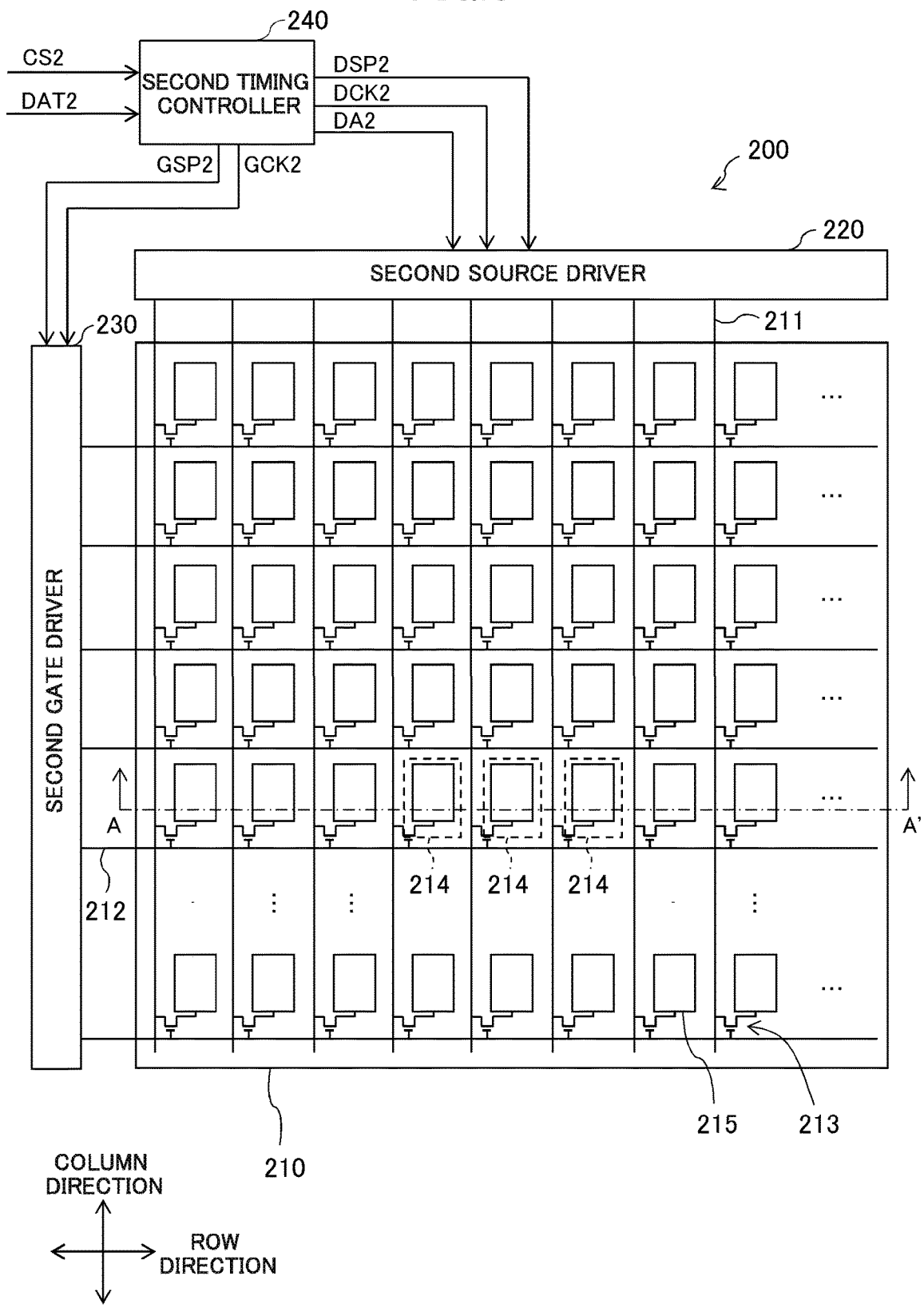
FIG. 3 is a plan view illustrating a schematic configuration of a rear-side display panel according to the present exemplary embodiment.

FIG. 2 is a plan view illustrating a schematic configuration of display panel 100, and FIG. 3 is a plan view illustrating a schematic configuration of display panel 200. FIG. 4 is a sectional view taken along a line A-A' in FIGS. 2 and 3.

A configuration of display panel 100 will be described with reference to FIGS. 2 and 4. As illustrated in FIG. 4, display panel 100 includes thin film transistor substrate 101 (hereinafter, TFT substrate) disposed on the side of backlight 400, opposed substrate 102, which is disposed on the observer side while being opposite to TFT substrate 101, and liquid crystal layer 103 disposed between TFT substrate 101 and opposed substrate 102. Polarizing plate 104 is disposed on the side of backlight 400 of display panel 100, and polarizing plate 105 is disposed on the observer side.

In TFT substrate 101, as illustrated in FIG. 2, a plurality of data lines 111 (source line) extending in a first direction (for example, a column direction), a plurality of gate lines 112 extending in a second direction (for example, a row direction) different from the first direction are formed, and thin film transistor 113 (hereinafter, TFT) is formed near an intersection between corresponding one of data lines 111 and corresponding one of gate lines 112. In planar view of display panel 100, a region surrounded by two data lines 111 adjacent to each other and two gate lines 112 adjacent to each other is defined as one pixel 114, and a plurality of pixels 114 are arranged in a matrix form (in the row and column directions). The plurality of data lines 111 are disposed at equal intervals in the row direction, and the plurality of gate lines 112 are disposed at equal intervals in the column direction. In TFT substrate 101, pixel electrode 115 is formed in each pixel 114, and one common electrode (not illustrated) common to the plurality of pixels 114 is formed. A drain electrode constituting TFT 113 is electrically connected to data line 111, a source electrode constituting TFT 113 is electrically connected to pixel electrode 115, and a gate electrode constituting TFT 113 is electrically connected to gate line 112.

As illustrated in FIG. 4, a plurality of color filters 102a (colored portions) each of which corresponds to pixel 114 are formed on opposed substrate 102. Each color filter 102a is surrounded by black matrix 102b blocking light transmission. For example, each color filter 102a is formed into a rectangular shape. The plurality of color filters 102a include red color filters made of a red (R color) material to transmit red light, green color filters made of a green (G color) material to transmit green light, and blue color filters made of a blue (B color) material to transmit blue light. One of the red color filters, one of the green color filters, and one of the blue color filters are repeatedly arranged in this order in the row direction, color filters having the same color are arranged in the column direction, and black matrices 102b are formed in boundaries of color filters 102a adjacent in the row and column directions. In accordance with color filters 102a, the plurality of pixels 114 include red pixels 114R corresponding to the red color filters, green pixels 114G corresponding to the green color filters, and blue pixels 114B corresponding to the blue color filters as illustrated in FIG. 2. In first display panel 100, one pixel group 124 is constructed with one red pixel 114R, one green pixel 114G, and one blue pixel 114B, and a plurality of pixel groups 124 are arranged in a matrix form.

First timing controller 140 has a known configuration. For example, based on first image data DAT1 and first control signal CS1 (such as a clock signal, a vertical synchronizing signal, and a horizontal synchronizing signal), which are output from image processor 300, first timing controller 140 generates various timing signals (data start pulse DSP1, data clock DCK1, gate start pulse GSP1, and gate clock GCK1) to control first image data DA1 and drive of first source driver 120 and first gate driver 130 (see FIG. 2). First timing controller 140 outputs first image data DA1, data start pulse DSP1, and data clock DCK1 to first source driver 120, and outputs gate start pulse GSP1 and gate clock GCK1 to first gate driver 130.

First source driver 120 outputs a data signal (data voltage) corresponding to first image data DA1 to data lines 111 based on data start pulse DSP1 and data clock DCK1. First gate driver 130 outputs a gate signal (gate voltage) to gate lines 112 based on gate start pulse GSP1 and gate clock GCK1.

The data voltage is supplied from first source driver 120 to each data line 111, and the gate voltage is supplied from first gate driver 130 to each gate line 112. Common voltage V$_{com}$ is supplied from a common driver (not illustrated) to the common electrode. When the gate voltage (gate-on voltage) is supplied to gate line 112, TFT 113 connected to gate line 112 is turned on, and the data voltage is supplied to pixel electrode 115 through data line 111 connected to said TFT 113. An electric field is generated by a difference between the data voltage supplied to pixel electrode 115 and common voltage V$_{com}$ supplied to the common electrode. The liquid crystal is driven by the electric field, and transmittance of backlight 400 is controlled, thereby displaying an image. In display panel 100, the color image is displayed by supply of a desired data voltage to data line 111 connected to pixel electrode 115 of each of red pixel 114R, green pixel 114G, and blue pixel 114B. A known configuration can be applied to display panel 100.

Next, a configuration of display panel 200 will be described below with reference to FIGS. 3 and 4. As illustrated in FIG. 4, display panel 200 includes TFT substrate 201 disposed on the side of backlight 400, opposed substrate 202, which is disposed on the observer side while being opposite to TFT substrate 201, and liquid crystal layer 203 disposed between TFT substrate 201 and opposed substrate 202. Polarizing plate 204 is disposed on the side of backlight 400 of display panel 200, and polarizing plate 205 is disposed on the observer side. Diffusion sheet 301 and/or adhesive sheet are disposed between polarizing plate 104 of display panel 100 and polarizing plate 205 of display panel 200.

Figure 5A:
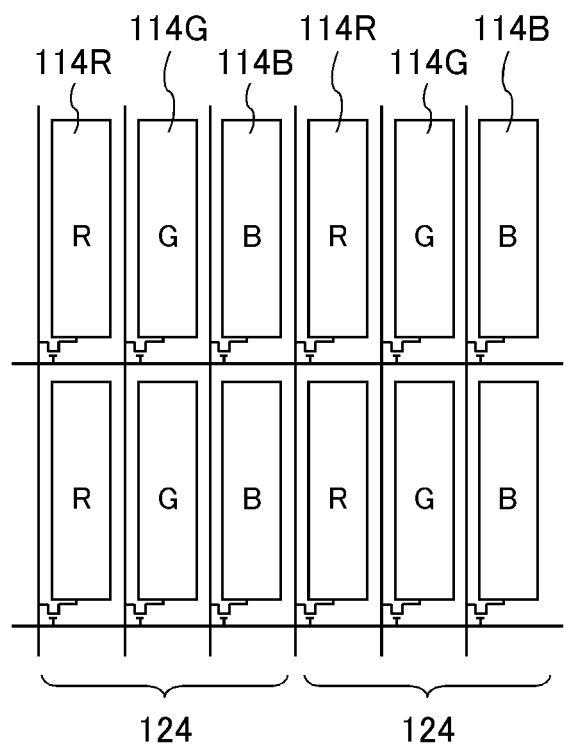
FIG. 5A is a plan view illustrating another example of pixel dispositions of the front-side display panel.
Figure 5B:
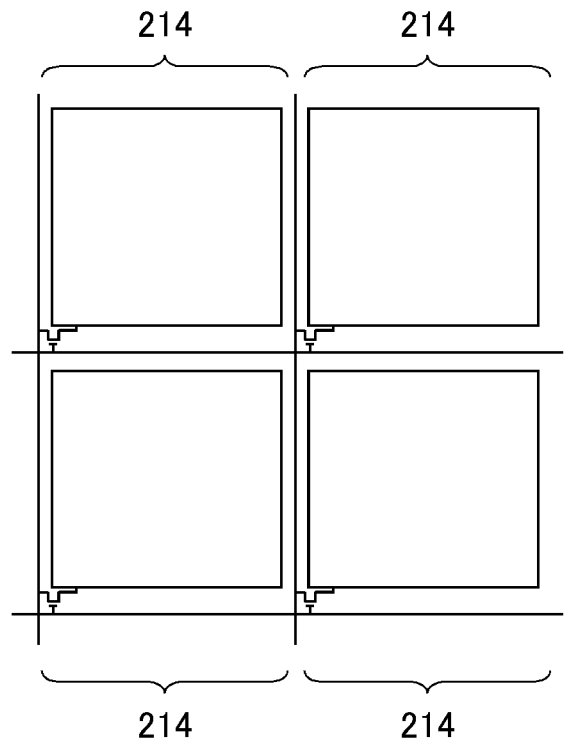
FIG. 5B is a plan view illustrating another example of pixel dispositions of the rear-side display panel.

In TFT substrate 201, as illustrated in FIG. 3, a plurality of data lines 211 (source lines) extending in the column direction, a plurality of gate lines 212 extending in the row direction are formed, and TFT 213 is formed near an intersection between corresponding one of data lines 211 and corresponding one of gate lines 212. In planar view of display panel 200, a region surrounded by two data lines 211 adjacent to each other and two gate lines 212 adjacent to each other is defined as one pixel 214, and a plurality of pixels 214 are arranged in a matrix form (the row direction and the column direction). The plurality of data lines 211 are disposed at equal intervals in the row direction, and the plurality of gate lines 212 are disposed at equal intervals in the column direction. In TFT substrate 201, pixel electrode 215 is formed in each pixel 214, and one common electrode (not illustrated) common to the plurality of pixels 214 is formed. A drain electrode constituting TFT 213 is electrically connected to data line 211, a source electrode constituting TFT 213 is electrically connected to pixel electrode 215, and a gate electrode constituting TFT 213 is electrically connected to gate line 212. Pixel 114 of display panel 100 and pixel of display panel 200 are disposed on one-to-one correspondence, and overlap each other in planar view. For example, red pixel 114R, green pixel 114G and blue pixel 114B, which constitute pixel group 124 in FIG. 2, and three pixels 214 in FIG. 3 overlap each other in planar view. It is also possible that a relationship between pixel 114 of display panel 100 and pixel 214 of display panel 200 is three to one. As illustrated in FIGS. 5A and 5B, one pixel group 124 (see FIG. 5A) composed of red pixel 114R, green pixel 114G and blue pixel 114B of display panel 100 may overlap one pixel 214 (see FIG. 5B) of display panel 200 in planar view.

As illustrated in FIG. 4, in opposed substrate 202, black matrix 202b blocking light transmission is formed at a position corresponding to a boundary of each pixel 214. The color filter is not formed in region 202a surrounded by black matrix 202b. For example, an overcoat film is formed in region 202a.

Second timing controller 240 has a known configuration. For example, based on second image data DAT2 and second control signal CS2 (such as a clock signal, a vertical synchronizing signal, and a horizontal synchronizing signal), which are output from image processor 300, second timing controller 240 generates various timing signals (data start pulse DSP2, data clock DCK2, gate start pulse GSP2, and gate clock GCK2) to control second image data DA2 and drive of second source driver 220 and second gate driver 230 (see FIG. 3). Second timing controller 240 outputs second image data DA2, data start pulse DSP2, and data clock DCK2 to second source driver 220, and outputs gate start pulse GSP2 and gate clock GCK2 to second gate driver 230.

Second source driver 220 outputs the data voltage corresponding to second image data DA2 to data lines 211 based on data start pulse DSP2 and data clock DCK2. Second gate driver 230 outputs the gate voltage to gate lines 212 based on gate start pulse GSP2 and gate clock GCK2.

The data voltage is supplied from second source driver 220 to each data line 211, and the gate voltage is supplied from second gate driver 230 to each gate line 212. Common voltage V$_{com}$ is supplied from the common driver to the common electrode. When the gate voltage (gate-on voltage) is supplied to gate line 212, TFT 213 connected to gate line 212 is turned on, and the data voltage is supplied to pixel electrode 215 through data line 211 connected to said TFT 213. An electric field is generated by a difference between the data voltage supplied to pixel electrode 215 and common voltage V$_{com}$ supplied to the common electrode. The liquid crystal is driven by the electric field, and transmittance of backlight 400 is controlled, thereby displaying an image. The monochrome image is displayed on display panel 200. A known configuration can be applied to display panel 200.

FIG. 6 is a block diagram illustrating a specific configuration of image processor 300. Image processor 300 includes first grayscale decision unit 311 (first image data generator), first image output unit 312, second image data generator 321, second grayscale decision unit 322, differential filtering processor 323 (first differential filtering processor), multiplier 324, adder 325, Gaussian filtering processor 326 (first smoothing processor), and second image output unit 327. Image processor 300 performs image processing (to be described later) based on input video signal Data, and for example, generates first image data DAT1 of the color image for display panel 100 and second image data DAT2 of the black-and-white image for display panel 200. Image processor 300 decides a grayscale (first grayscale) of first image data DAT1 and a grayscale (second grayscale) of second image data DAT2 such that a combined gamma value (γ value) of the display image in which the color image and the black-and-white image are combined becomes a desired value (for example, γ=2.2).

When receiving input video signal Data transmitted from an external system, image processor 300 transfers input video signal Data to first grayscale decision unit 311 and second image data generator 321. For example, input video signal Data includes luminance information (grayscale information) and color information. The color information is for designating the color. For example, in the case that input video signal Data is constructed with 8 bits, each of a plurality of colors including the R color, the G color, and the B color can be expressed by values of 0 to 255. The plurality of colors include at least the R color, the G color, and the B color, and may further include a W (white) color and/or a Y (yellow) color. In the case that the plurality of colors include the R color, the G color, and the B color, the color information about input video signal Data is expressed by an "RGB value" ([R value, G value, B value]). For example, the RGB value is expressed by [255, 255, 255] in the case that the color corresponding to input video signal Data is white, the RGB value is expressed by [255, 0, 0] in the case that the color corresponding to input video signal Data is red, and the RGB value is expressed by [0, 0, 0] in the case that the color corresponding to input video signal Data is black.

When obtaining input video signal Data, second image data generator 321 generates black-and-white image data corresponding to the black-and-white image using a maximum value (the R value, the G value, or the B value) in each color value (in this case, the RGB value of [R value, G value, B value]) indicating the color information about input video signal Data. Specifically, in the RGB value corresponding to target pixel 214, second image data generator 321 generates the black-and-white image data by setting the maximum value in the RGB values to the value of target pixel 214. Second image data generator 321 outputs the generated black-and-white image data to second grayscale decision unit 322.

Figure 7:
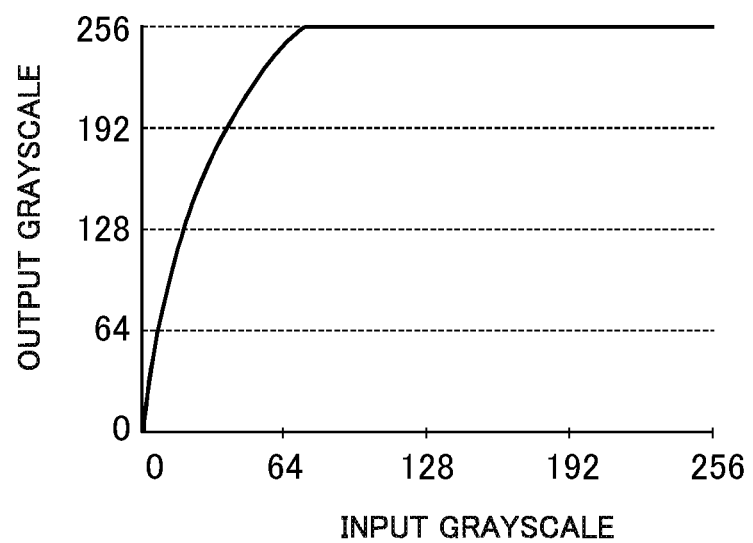
FIG. 7 is a graph representing a relationship between an input gradation and an output gradation.

When obtaining the generated black-and-white image data, second grayscale decision unit 322 refers to grayscale table (grayscale LUT) to decide the grayscale (second grayscale) corresponding to the black-and-white image data (second gamma processing). For example, second grayscale decision unit 322 decides the grayscale of the black-and-white image based on a gamma characteristic for display panel 200. For example, as illustrated in FIG. 7, in the gamma characteristic for display panel 200, an output grayscale changes according to an input grayscale in a region where the input grayscale is less than or equal to a predetermined grayscale (64 grayscales), and the output grayscale becomes 256 grayscales in a region where the input grayscale is higher than the predetermined grayscale (64 grayscales). Second grayscale decision unit 322 outputs the black-and-white image data subjected to the second gamma processing to differential filtering processor 323 and adder 325.

When obtaining the black-and-white image data from second grayscale decision unit 322, differential filtering processor 323 performs differential filtering (also referred to as edge detection processing) on the black-and-white image data to detect (emphasize) a boundary (edge) at which luminance changes largely. For example, differential filtering processor 323 performs the differential filtering using a Prewitt filter or a Sobel filter. The differential filtering deletes a low-frequency component, so that the edge at which the luminance changes largely can be emphasized. A known method can be adopted as the differential filtering. Differential filtering processor 323 outputs the black-and-white image data subjected to the differential filtering to multiplier 324.

When obtaining the black-and-white image data from differential filtering processor 323, multiplier 324 multiplies the grayscale of the black-and-white image data by gain factor GF (correction coefficient) (multiplication). The grayscale increases by multiplying the grayscale of the black-and-white image data by gain factor GF. Gain factor GF is a value calculated by the following equation (4). Control is performed using gain factor GF such that a linear change can be performed, and gain factor GF is set to a desired value. Multiplier 324 outputs the black-and-white image data subjected to the multiplication to adder 325.

Adder 325 adds the black-and-white image data obtained from second grayscale decision unit 322 and the black-and-white image data obtained from multiplier 324, and outputs an addition result to Gaussian filtering processor 326.

When obtaining the black-and-white image data from adder 325, Gaussian filtering processor 326 performs Gaussian filtering on the black-and-white image data. For example, the Gaussian filtering means processing (smoothing processing) of smoothing an image using a Gaussian filter (mean filter) having a characteristic of a normal distribution (see the following function expression (1)), in which a weight of a filter coefficient used to calculate a mean value increases as the pixel is closer to the target pixel and the weight of the filter coefficient decreases as the pixel is farther away from the target pixel.

[Mathematical Formula 1]

$$f(x, y) = \frac{1}{2\pi\sigma^2} \exp\left(-\frac{x^2 + y^2}{2\sigma^2}\right) \qquad (1)$$

Figure 8:
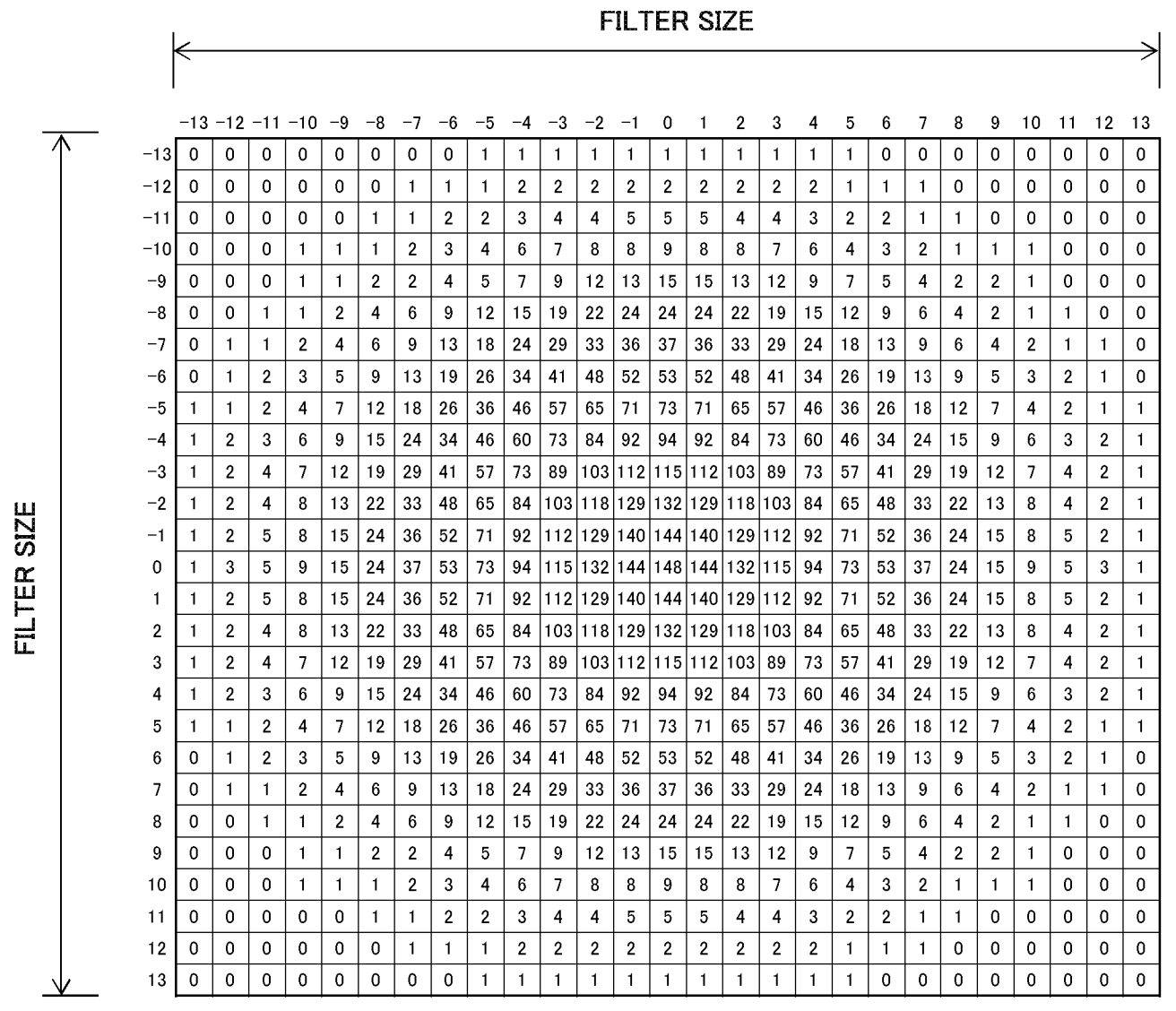
Figure 9:
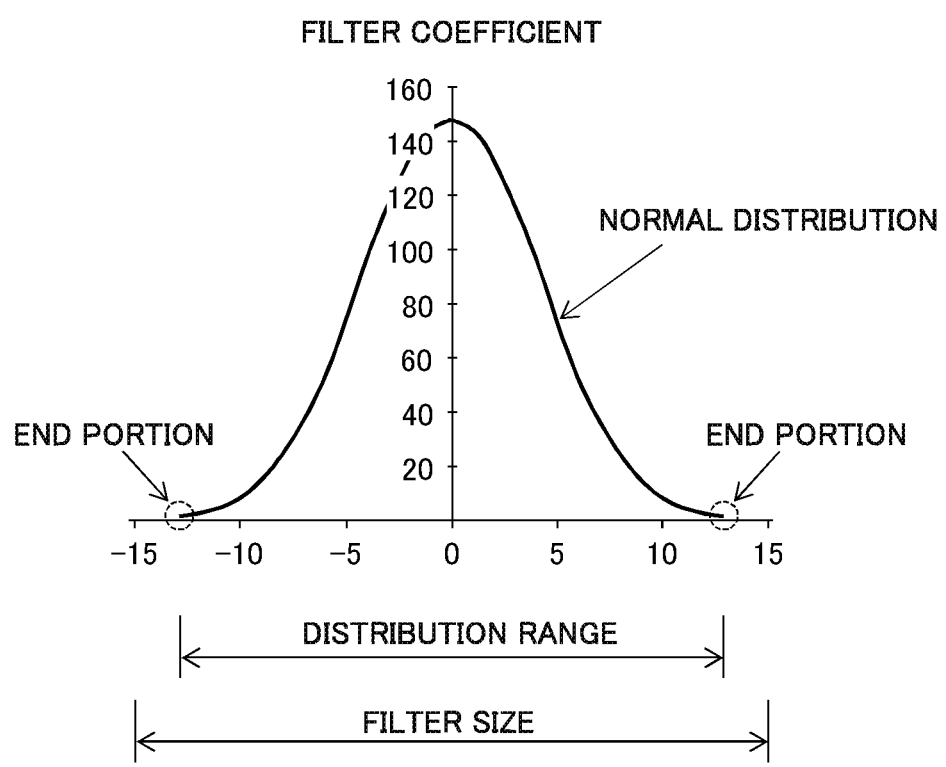
FIG. 9 is a graph illustrating a two-dimensional distribution of a filter coefficient corresponding to a center position of Gaussian filter illustrated in FIG. 8.

For example, Gaussian filtering processor 326 performs the Gaussian filtering using a filter having a 27-by-27 pixel region (filter size) illustrated in FIG. 8. FIG. 9 is a graph illustrating a two-dimensional distribution (normal distribution) of a filter coefficient corresponding to a center position of the filter (Gaussian filter) illustrated in FIG. 8. In the filter of FIG. 8, dispersion coefficient σ of the equation (1) is set to 4.2, and a sum of the filter coefficients corresponding to pixels 214 is set to $2^{14}$. For example, Gaussian filtering processor 326 decides a calculation result, in which the sum of the values in each of which the grayscale of each of 27 pixels by 27 pixels including the target pixel and up and down and right and left 13 pixels (reference pixel) of the target pixel is multiplied by the filter coefficient of the filter of FIG. 8 is divided by $2^{14}$, as the grayscale of the target pixel in the black-and-white image data obtained from adder 325. After performing the Gaussian filtering on all pixels 214, Gaussian filtering processor 326 outputs the black-and-white image data subjected to the Gaussian filtering to first grayscale decision unit 311 and second image output unit 327.

Based on input video signal Data received from an external system and the black-and-white image data obtained from Gaussian filtering processor 326, first grayscale decision unit 311 decides the grayscale (first grayscale) of the color image displayed on display panel 100 (first gamma processing). For example, first grayscale decision unit 311 decides the grayscale of the color image such that the combined image (display image) in which the black-and-white image and the color image are combined has the combined gamma value of 2.2. First grayscale decision unit 311 outputs the color image data subjected to the first gamma processing to first image output unit 312.

First image output unit 312 outputs the color image data (first grayscale) to first timing controller 140 as first image data DAT1. Second image output unit 327 outputs the black-and-white image data (second grayscale) to second timing controller 240 as second image data DAT2. Image processor 300 outputs first control signal CS1 to first timing controller 140, and outputs second control signal CS2 to second timing controller 240 (see FIGS. 2 and 3).

In the case that an end portion (skirt) of a distribution having a wide range exceeds a filter size in the normal distribution of FIG. 9, in the second image, the grayscale of the target pixel becomes higher than an objective grayscale, and possibly a phenomenon of reversing the black-and-white (light and darkness) image is generated. The end portion of the normal distribution corresponds to a portion in which the filter coefficient becomes a minimum value (for example, 0 to 2). The normal distribution changes according to dispersion coefficient σ of the normal distribution function (the equation (1)). In the exemplary embodiment, as illustrated in FIG. 9, dispersion coefficient σ is preferably decided according to the filter size such that the end portion of the normal distribution falls within the filter size. Consequently, the phenomenon of reversing the light and darkness of the second image can be prevented.

Next, a method for calculating gain factor GF illustrated in FIG. 6 will be described below. Gain factor GF is set such that peak luminance (peak grayscale) of the input image (in this case, the grayscale decided by second grayscale decision unit 322) corresponding to input video signal Data is matched with peak luminance (peak grayscale) of the second image (black-and-white image) corresponding to second image data DAT2 (see the following equation (2)).

$$\text{peak luminance of input image} = \text{peak luminance of second image} \quad (2)$$

In the equation (2), the peak luminance of the second image is given by the following equation (3) corresponding to the configuration in FIG. 6.

$$\text{peak luminance of second image} = (\text{peak luminance of input image} \times \text{differential filtering} \times \text{gain factor GF} + \text{peak luminance of input image}) \times \text{Gaussian filtering} \quad (3)$$

The following equation (4) is obtained when the equation (3) is solved with respect to gain factor GF.

$$\text{gain factor GF} = (\text{peak luminance of input image} - \text{peak luminance of input image} \times \text{Gaussian filtering})/(\text{peak luminance of input image} \times \text{differential filtering} \times \text{Gaussian filtering}) \quad (4)$$

Figure 10:
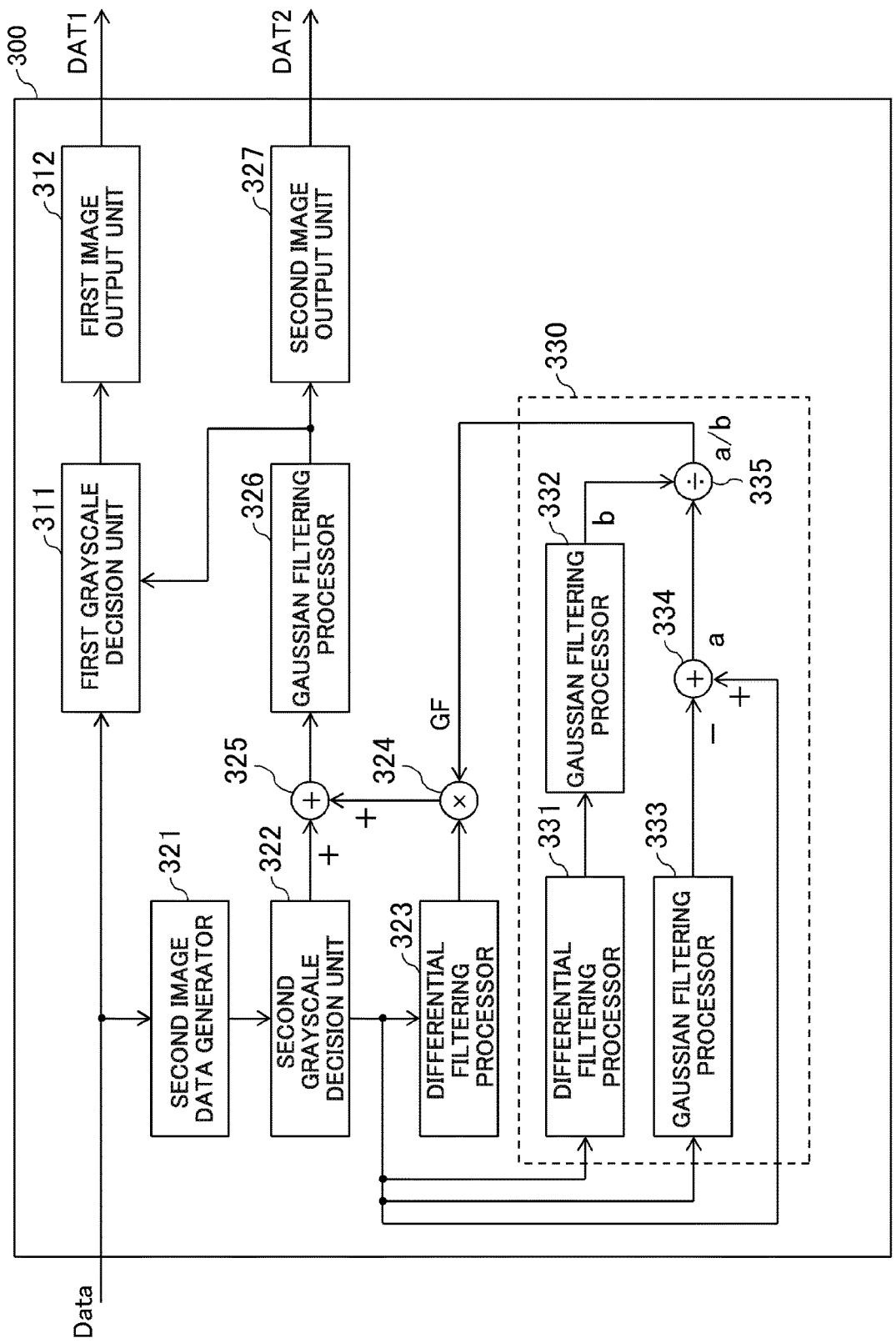
FIG. 10 is a block diagram illustrating variation of the image processor.

FIG. 10 is a block diagram in which gain factor calculator 330 (correction coefficient calculator) is added to image processor 300 in FIG. 6. Gain factor calculator 330 expresses a configuration corresponding to the equation (4). That is, gain factor calculator 330 includes differential filtering processor 331 (second differential filtering processor), Gaussian filtering processor 332 (second smoothing processor), Gaussian filtering processor 333 (third smoothing processor), adder 334, and divider 335. Differential filtering processor 331 has the same function as differential filtering processor 323, and Gaussian filtering processors 332, 333 have the same function as Gaussian filtering processor 326.

When obtaining the black-and-white image data from second grayscale decision unit 322, differential filtering processor 331 performs the differential filtering (edge detection processing) on the black-and-white image data similarly to differential filtering processor 323. Differential filtering processor 331 outputs the black-and-white image data subjected to the differential filtering to Gaussian filtering processor 332. When obtaining the black-and-white image data from differential filtering processor 331, Gaussian filtering processor 332 performs the Gaussian filtering on the black-and-white image data. Gaussian filtering processor 332 outputs the black-and-white image data subjected to the Gaussian filtering to divider 335.

When obtaining the black-and-white image data from second grayscale decision unit 322, Gaussian filtering processor 333 performs the Gaussian filtering on the black-and-white image data. Gaussian filtering processor 333 outputs the black-and-white image data subjected to the Gaussian filtering to adder 334.

Adder 334 subtracts the grayscale of the black-and-white image data subjected to the Gaussian filtering from the grayscale of the black-and-white image data output from second grayscale decision unit 322, and outputs a subtraction result to divider 335.

Divider 335 divides the subtraction result (grayscale) by the grayscale of the black-and-white image data subjected to the Gaussian filtering by the Gaussian filtering processor 332. Divider 335 outputs a division result as gain factor GF to multiplier 324.

Figure 11A:
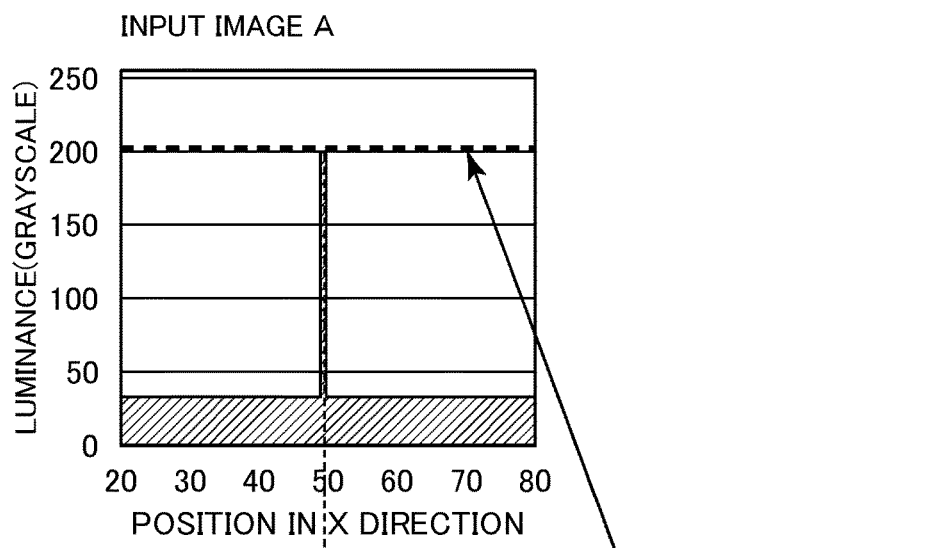
FIG. 11A illustrates a grayscale of input image A.
Figure 11B:
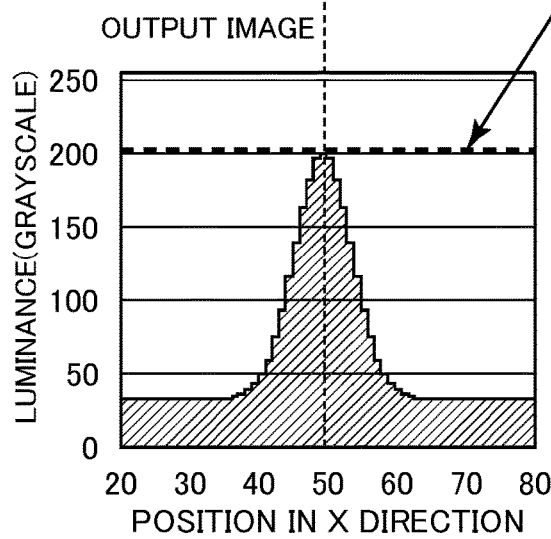
FIG. 11B illustrates a grayscale of a second image (output image) with respect to the input image A.

Examples of the input image and output image in image processor 300 having the above configuration will be described. FIG. 11A illustrates an example (input image A) of the input image (the grayscale decided by second grayscale decision unit 322). Input image A indicates a minute bright-spot image in which one or a plurality of pixels 214 has 200 grayscales (peak luminance) while surrounding (background) pixel 214 has 30 grayscales. FIG. 11B illustrates a second image (output image) with respect to input image A. In image processor 300 of FIG. 10, the peak luminance of the second image is equal to the peak luminance of input image A as illustrated in FIG. 11B. Consequently, the objective luminance can be obtained in the minute bright-spot image or the minute bright-line image.

Figure 12A:
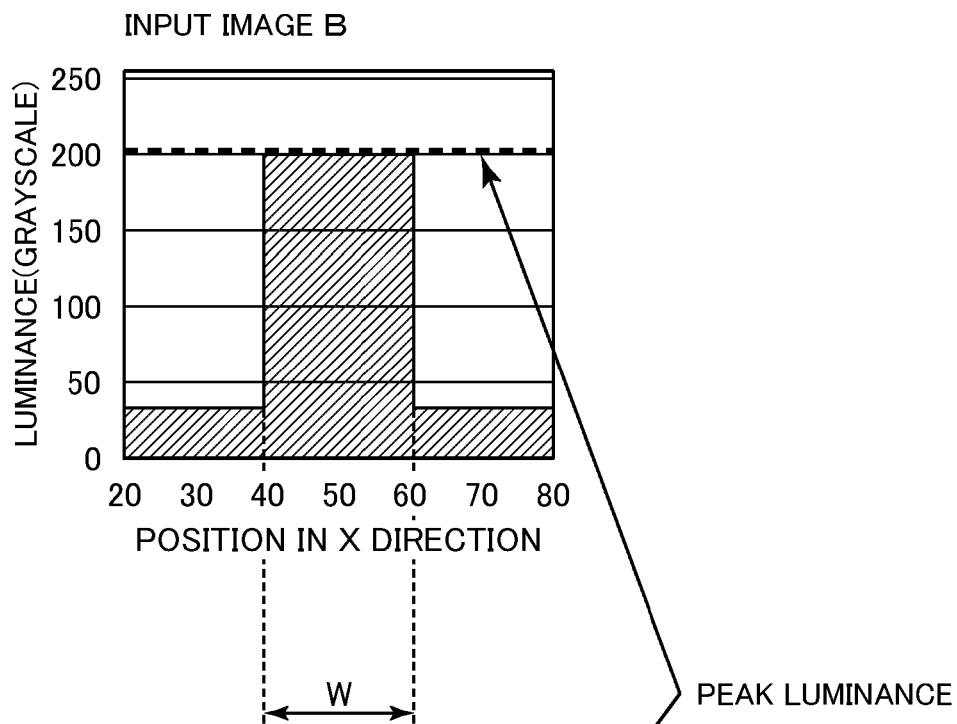
FIG. 12A illustrates a grayscale of input image B.
Figure 13:
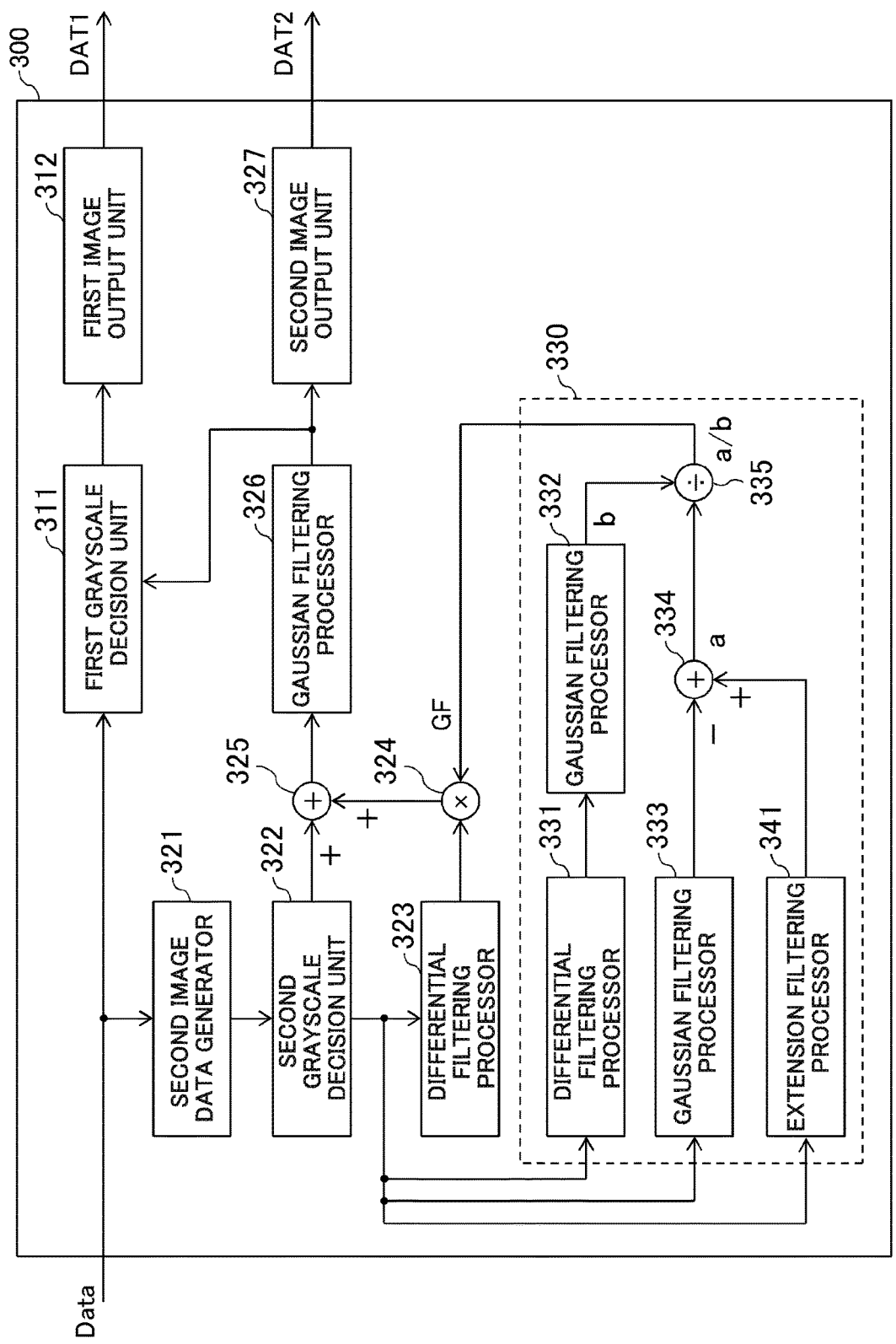
FIG. 13 illustrates another configuration of an image processor of the exemplary embodiment.

In the case that the input image is the bright-spot image (input image B) in which 20 pixels 214 have 200 grayscales (peak luminance) while the surrounding (background) pixel 214 has 30 grayscales as illustrated in input image B of FIG. 12A, width W of a high-luminance region is not spread (or narrowed) although the peak luminance of the second image (output image) is equal to the peak luminance of input image B. Thus, it is difficult to sufficiently reduce the display defect caused by the parallax. In order to solve the problem of the parallax, gain factor calculator 330 preferably includes extension filtering processor 341 as illustrated in FIG. 13. FIG. 13 illustrates another configuration of image processor 300 of the exemplary embodiment. Image processor 300 in FIG. 13 differs from image processor 300 in FIG. 10 in that extension filtering processor 341 is added, and the other configuration is the same.

When obtaining the black-and-white image data from second grayscale decision unit 322, extension filtering processor 341 performs extension filtering on the black-and-white image data. Specifically, extension filtering processor 341 performs extension filtering on each pixel 214 such that the maximum luminance in a predetermined filter size (for example, 13 pixels by 13 pixels) is set to the luminance of the target pixel. The high-luminance region (for example, a white region) extends as a whole through the extension filtering. The filter size is not limited to the 13-by-13 pixel region. The filter shape is not limited to the square shape, but the filter may be formed into a circular shape.

Figure 12B:
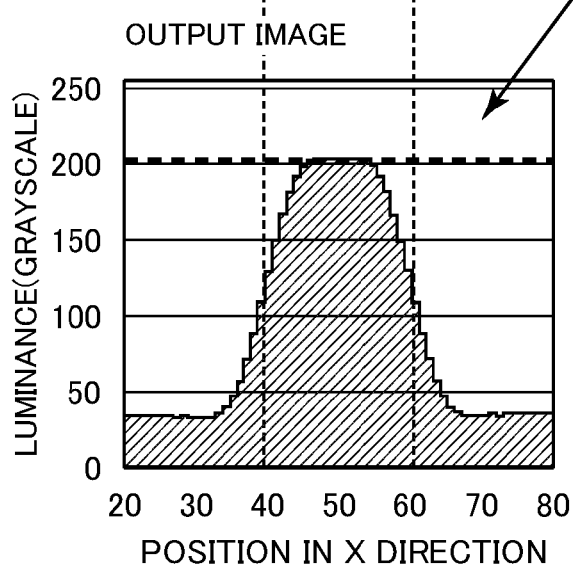
FIG. 12B illustrates a grayscale of a second image (output image) with respect to the input image B.
Figure 14A:
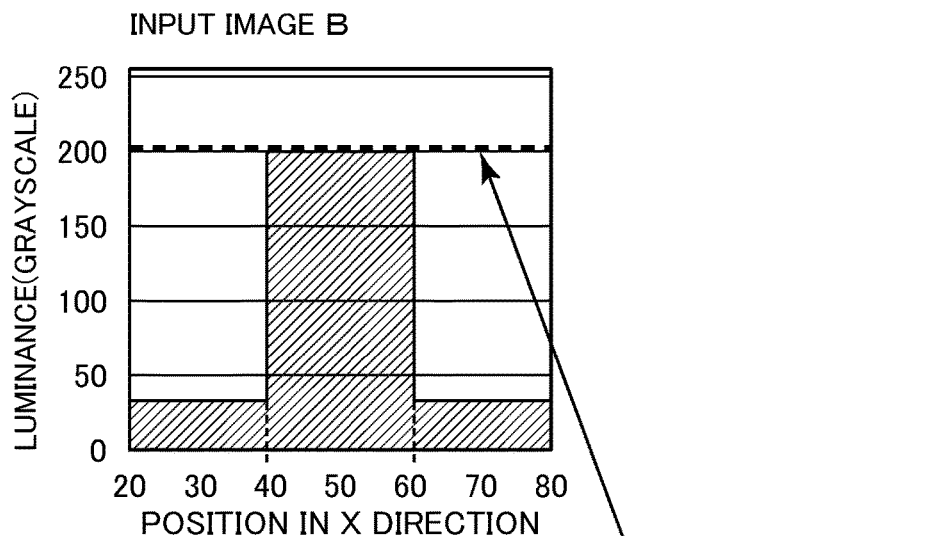
FIG. 14A illustrates a grayscale of input image B.
Figure 14B:
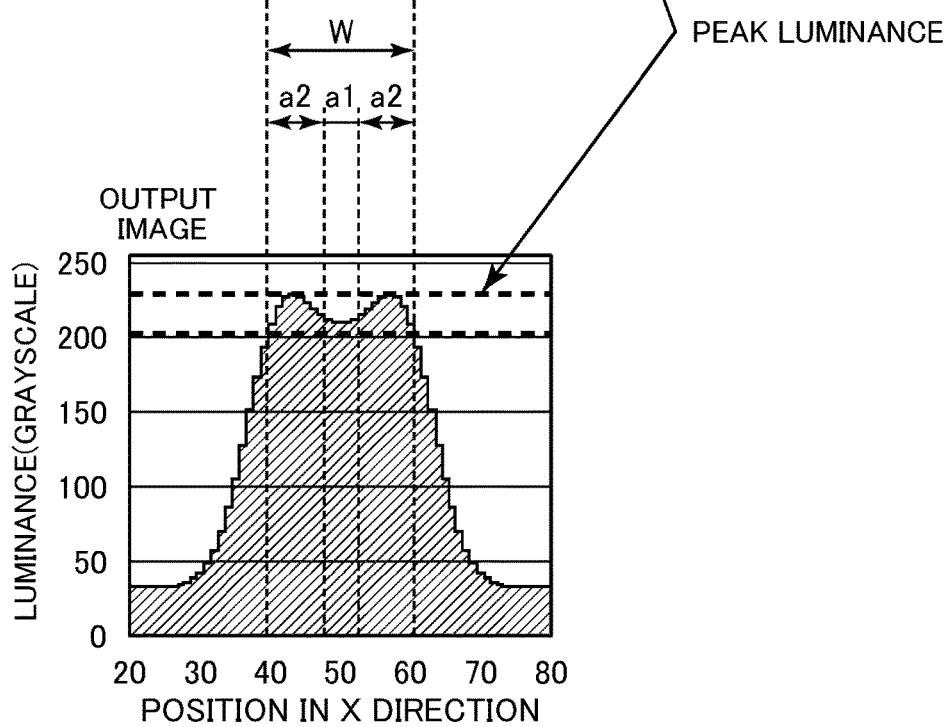
FIG. 14B illustrates a grayscale of a second image (output image) with respect to input image B.

FIG. 14A illustrates input image B identical to that in FIG. 12B. FIG. 14B illustrates the second image (output image) corresponding to input image B in image processor 300 of FIG. 13. As illustrated in FIG. 14B, a grayscale distribution of the second image includes first region a1 in which the luminance is substantially equal to the peak luminance (200 grayscales) of input image B, and second regions a2 on right and left sides of first region a1, the luminance of second regions a2 being higher than the peak luminance (200 grayscales). A width in which the first region and the second regions are added is substantially equal to width W1 of the peak luminance of input image B, and the high-luminance region of 30 grayscales to 200 grayscales is extended. In image processor 300 of FIG. 13, as illustrated in FIG. 14B, the peak luminance of the second image is greater than or equal to the peak luminance of input image B, and the width of the high-luminance region is widened. Thus, in the wide bright-spot image or bright-line image, the desired luminance can be obtained, and the problem of the parallax can be solved.

Figure 15:
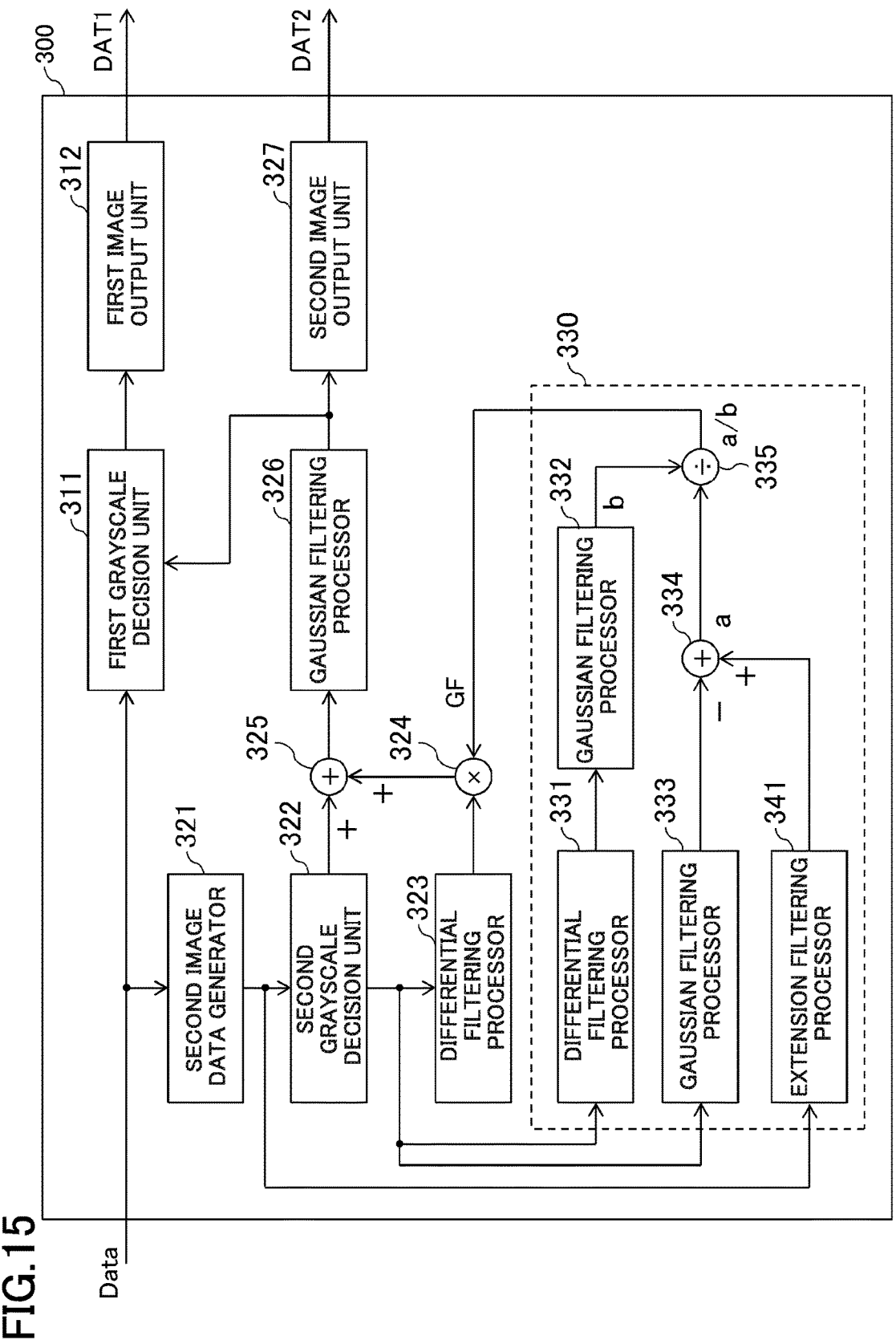
FIG. 15 illustrates another configuration of an image processor of the exemplary embodiment.
Figure 16A:
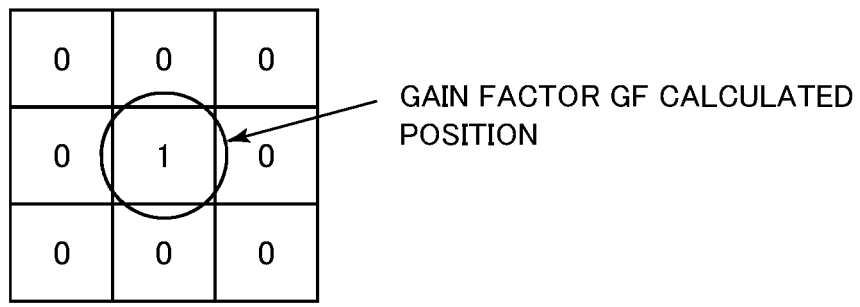
FIG. 16A illustrates a bright-line image (input image) including a bright line.
Figure 16B:
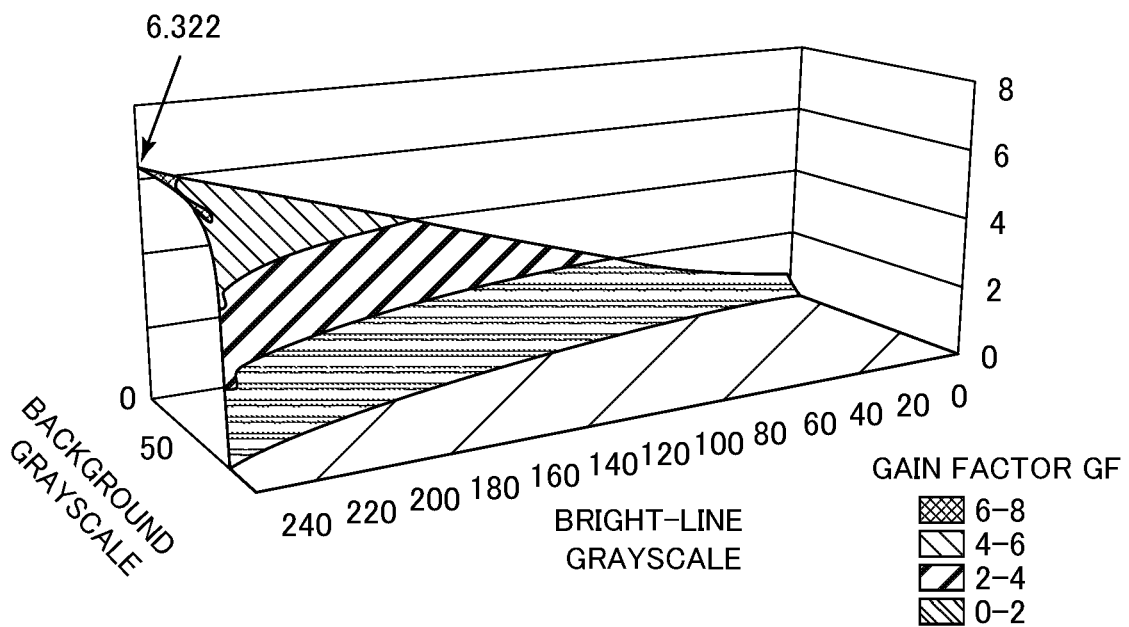
FIG. 16B is a graph illustrating a distribution of gain factor when the bright-line image in FIG. 16A is input.

FIG. 15 is a block diagram illustrating a still another configuration of image processor 300. The input data input to extension filtering processor 341 in image processor 300 in FIG. 15 is different from that in image processor 300 in FIG. 13, and the other configuration is the same. In image processor 300 in FIG. 15, the image data prior to the second gamma processing performed by second grayscale decision unit 322, namely, the black-and-white image data generated by second image data generator 321 is input to extension filtering processor 341. FIG. 16B is a graph illustrating a distribution of gain factor GF in the target pixel when one pixel 214 (target pixel) inputs the bright-spot image (see FIG. 16A) that becomes the peak luminance. In FIG. 16A, "1" indicates the bright-spot portion and "0" indicates the background portion. As illustrated in FIG. 16B, gain factor GF increases as the grayscale increases in the bright-spot portion and the grayscale decreases in the background portion.

Figure 17A:
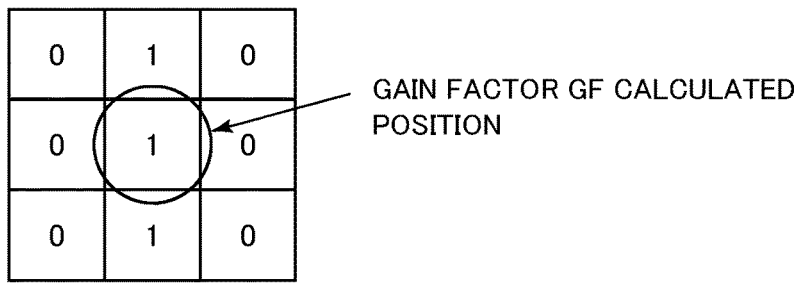
FIG. 17A illustrates a bright-line image (input image) including a bright line.
Figure 17B:
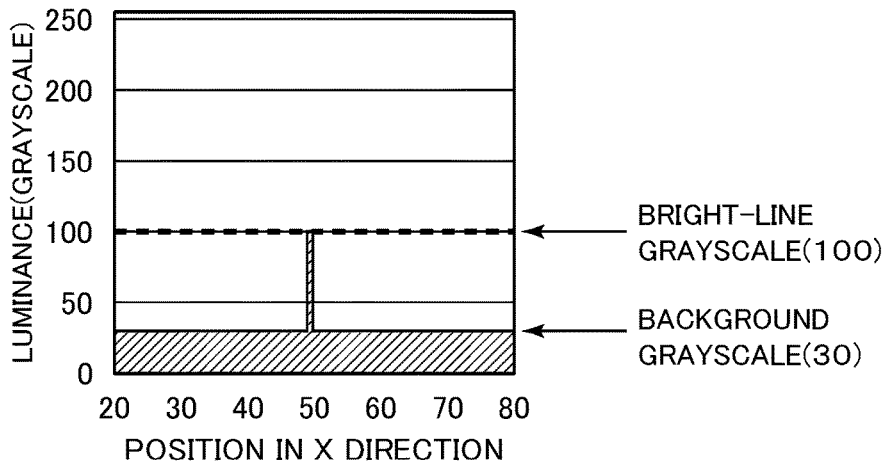
FIG. 17B illustrates examples of the bright-line grayscale and a background grayscale.
Figure 17C:
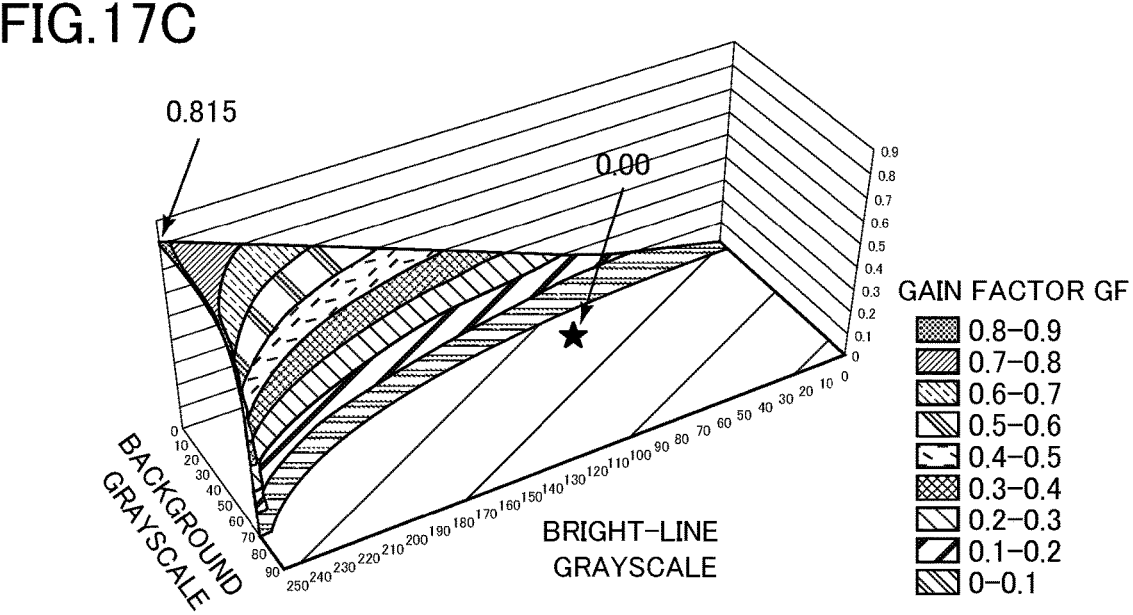
FIG. 17C is a graph illustrating a distribution of gain factor when the bright-line image in FIG. 17A is input.
Figure 18A:
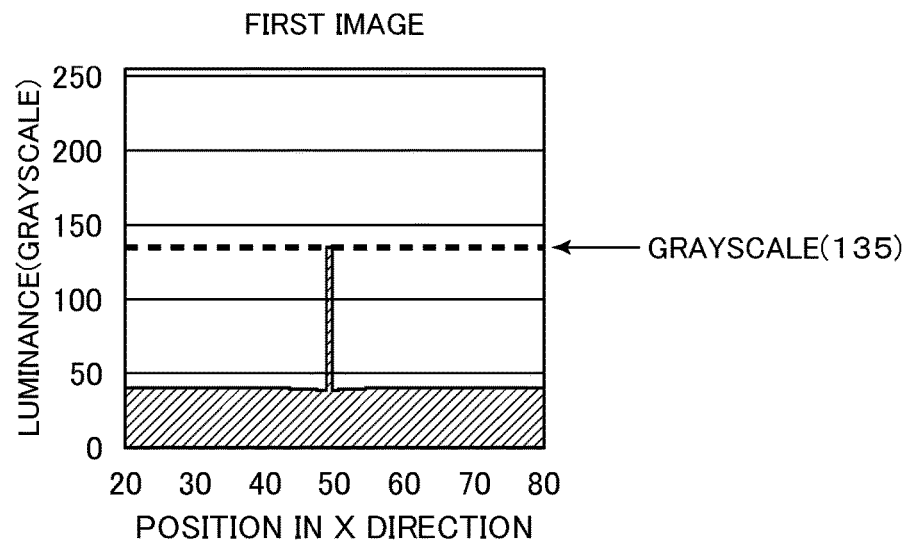
FIG. 18A illustrates a first image.
Figure 18B:
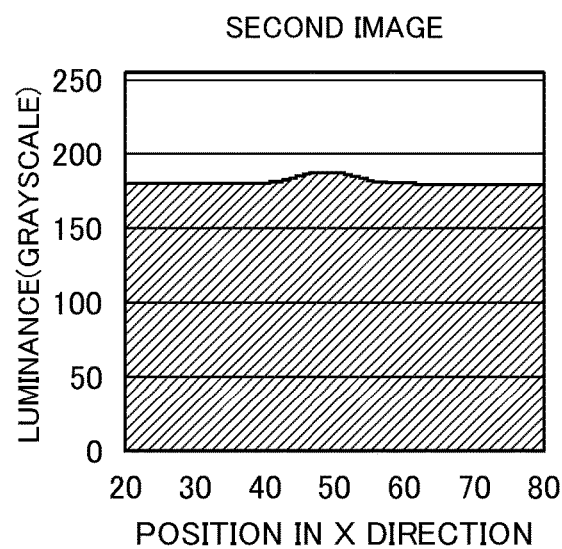
FIG. 18B illustrates a second image.
Figure 19A:
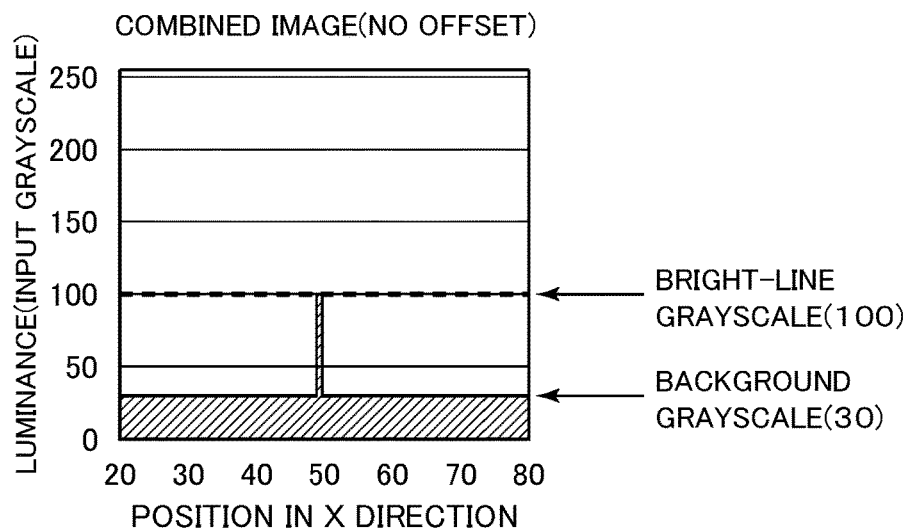
FIG. 19A illustrates a combined image in which the first image and the second image are combined.
Figure 19B:
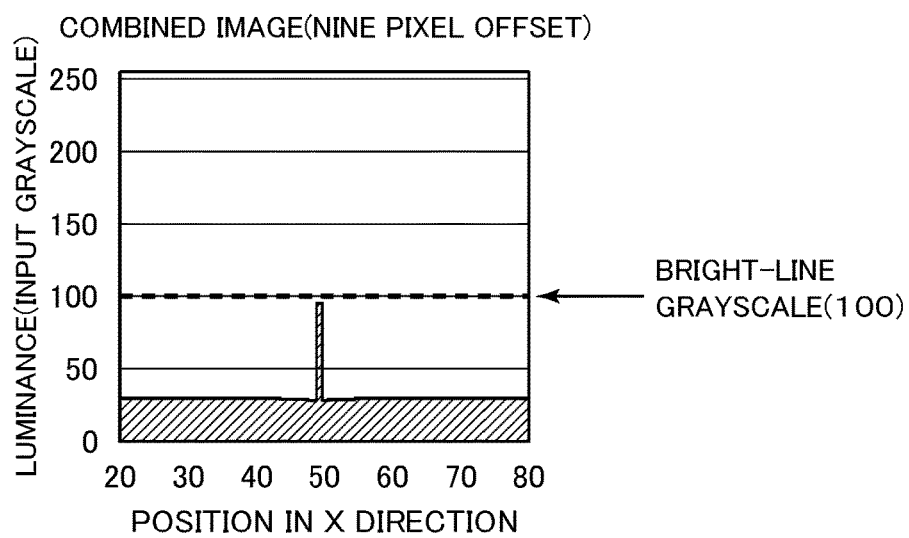
FIG. 19B illustrates a combined image in which the first image and the second image are combined.

FIG. 17A illustrates a bright-line image (input image) including a bright line in which one-row pixel 214 becomes the peak luminance, and the surrounding background of the bright line. FIG. 17B illustrates examples of a bright-line grayscale (100 grayscales) and a background grayscale (30 grayscales) of the input image. FIG. 17C is a graph illustrating a distribution of gain factor GF in the target pixel when the bright-line image in FIG. 17A is input. When image (the grayscale prior to the decision of second grayscale decision unit 322) in FIG. 17B is input, gain factor GF becomes 0.00 by the distribution in FIG. 17C. In image processor 300 of FIG. 15, the second image in FIG. 18B is generated when gain factor GF is calculated (GF=0.00). The first image of FIG. 18A is generated based on the generated second image. For gain factor GF of 0.00, the second image becomes an image in which the grayscale is substantially kept constant (flat) because the second image becomes an image obtained by performing the Gaussian filtering on the black-and-white image data decided by second grayscale decision unit 322 (see FIG. 18B). In this case, in the first image, deficiency of the luminance in the second image is covered, and the peak luminance becomes 135 grayscales (see FIG. 18A). FIG. 19A illustrates the combined image (display image) in which the first image and the second image are combined. As illustrated in FIG. 19A, the peak luminance of the combined image is equal to the peak luminance of the input image (see FIG. 17A) when viewed from a front direction. As illustrated in FIG. 19B, the peak luminance of the combined image is also equal to the peak luminance of the input image (see FIG. 17A) when viewed from an oblique direction. Appearance of a flare can be reduced to the minimum as illustrated in FIG. 19B.

Figure 20A:
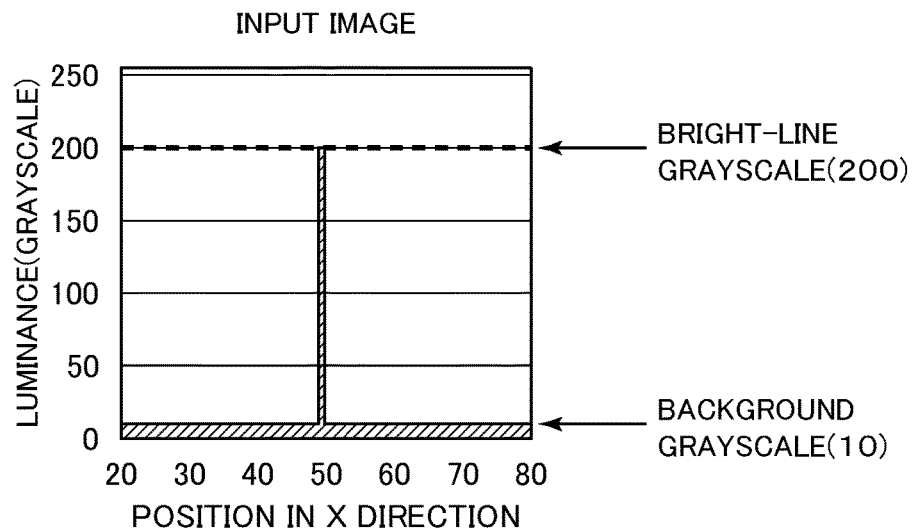
FIG. 20A illustrates a bright-line grayscale of the bright-line image and a background grayscale.
Figure 20B:
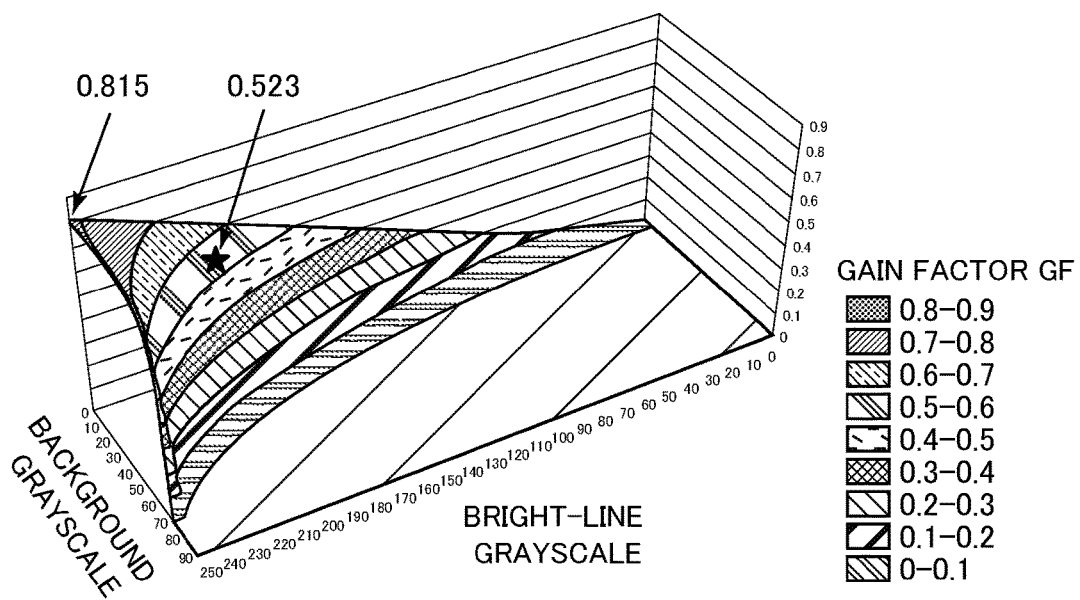
FIG. 20B illustrates a distribution of a gain factor.
Figure 21A:
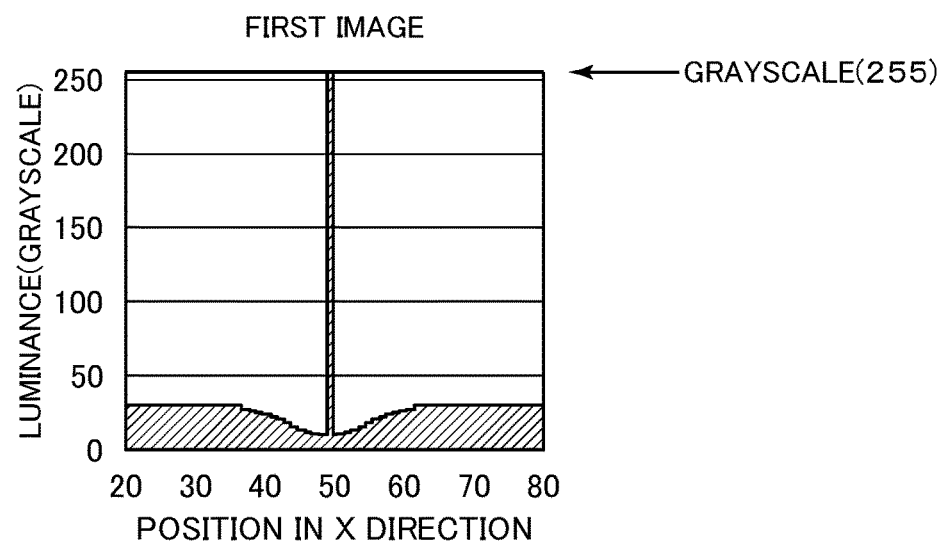
FIG. 21A illustrates a first image.
Figure 21B:
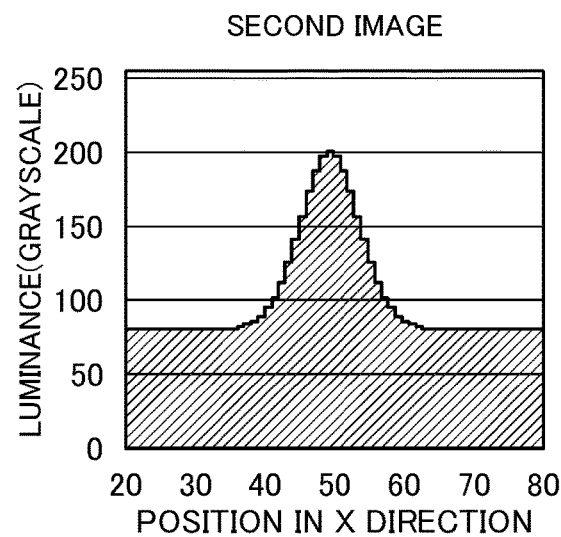
FIG. 21B illustrates a second image.
Figure 22A:
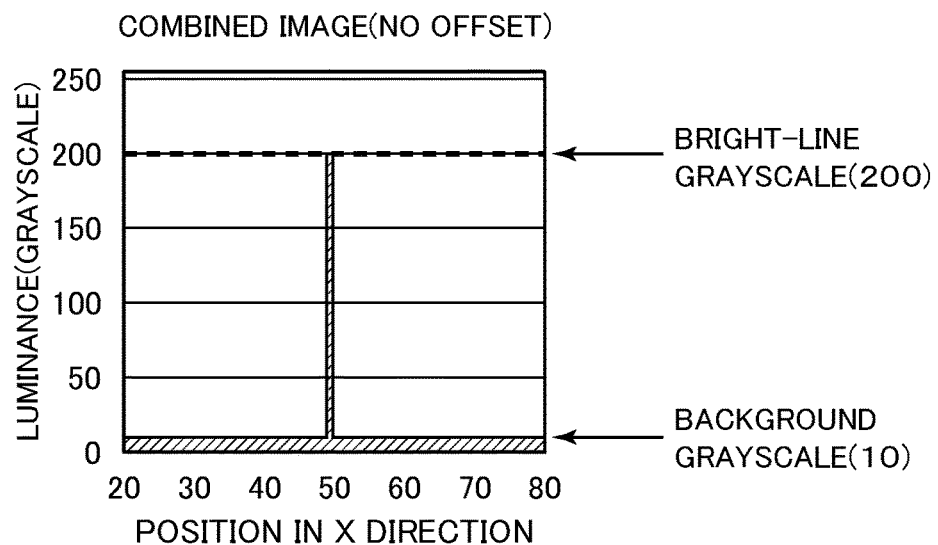
FIG. 22A illustrates a combined image in which the first image and the second image are combined.
Figure 22B:
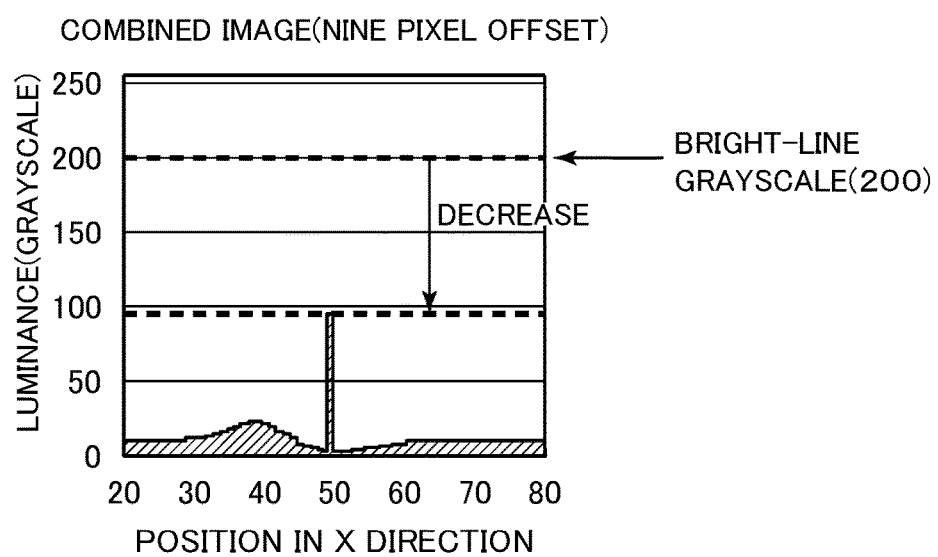
FIG. 22B illustrates a combined image in which the first image and the second image are combined.

FIG. 20A illustrates the input image (the grayscale prior to the decision of second grayscale decision unit 322) when the bright-line grayscale of the bright-line image (input image) in FIG. 17A is set to 200 while the background grayscale is set to 10. FIG. 20B illustrates a distribution of the same gain factor as FIG. 17C. In the distribution of FIG. 20B, gain factor GF becomes 0.523 when the image in FIG. 20A is input. In image processor 300 of FIG. 15, the second image in FIG. 21B is generated when gain factor GF is calculated (GF=0.523). A first image of FIG. 21A is generated based on the generated second image. In the first image, the deficiency of the luminance in the second image is allocated, and the peak luminance becomes 255 grayscales. This means that gain factor GF is calculated such that the maximum value in which the luminance can be corrected is selected in the first image. FIGS. 22A and 22B illustrate the combined image (display image) in which the first image and the second image are combined. As illustrated in FIG. 22B, the peak luminance of the combined image is lower than the peak luminance of input image (see FIG. 20B) when viewed from the oblique direction. As illustrated in FIG. 22A, the peak luminance of the combined image is equal to the peak luminance of input image (see FIG. 20B) when viewed from the front direction. For the bright-line image in FIG. 20A, the luminance is corrected until the first image reaches a breaking point of 255 grayscales. However, the uncorrectable luminance exceeding 255 grayscales is assured in the second image. Thus, the flare remains slightly as illustrated in FIG. 22B. However, the flare can be reduced to an extent in which the display quality is not degraded.

At this point, the grayscale of the combined image (display image) is expressed by (grayscale of first image)× (grayscale of second image)/255 grayscales. For this reason, when the grayscale of the second image is excessively lowered, the grayscale of the first image increases excessively, and the adjustment can hardly be performed. When the grayscale of the second image changes steeply, the flare of the combined image is easily visually recognized. On the other hand, in the configuration of the exemplary embodiment, image processor 300 keeps the grayscale of the second image substantially constant (flat), and properly shares the grayscale of the first image and the grayscale of the second image such that the deficiency of the luminance in the second image is covered by the first image. Consequently, the appearance of the flare can be reduced to the minimum while the luminance of the bright spot is assured.

Liquid crystal display device 10 of the present disclosure is not limited to the above configuration. For example, in the configuration, the Gaussian filtering with the normal distribution function (see equation (1)) is described as an example of the smoothing processing performed by the first smoothing processor. However, the smoothing processing is not limited the above example. The smoothing processing may be processing with a window function such as a Hanning window, a flat-top window, a Blackman-Harris window, and a Kaiser-Bessel window or processing with a simply conical filter.

In the above, the specific embodiments of the present application have been described, but the present application is not limited to the above-mentioned embodiments, and various modifications may be made as appropriate without departing from the spirit of the present application.

What is claimed is:
1. A liquid crystal display device comprising:
a first display panel that displays a first image;
a second display panel that displays a second image and is opposed to the first display panel; and
an image processor that generates first image data corresponding to the first image and second image data corresponding to the second image based on input video signal,
wherein the image processor includes a first differential filtering processor that performs differential filtering of detecting a boundary at which luminance changes in input image data derived from the input video signal, a multiplier that multiplies a grayscale of the image data subjected to the differential filtering by the first differential filtering processor by a correction coefficient settable to a desired value, and a first smoothing processor that performs smoothing processing on image data obtained by adding the image data multiplied by the correction coefficient and the input image data, and the image processor generates the first image data based on the input image data and the image data subjected to the smoothing processing, and generates the second image data based on the image data subjected to the smoothing processing, wherein the image processor further includes a correction coefficient calculator that calculates the correction coefficient such that peak luminance of the input image data determines peak luminance of the second image data.

2. The liquid crystal display device according to claim 1, wherein the first smoothing processor performs the smoothing processing on the input image data using a mean filter having a filter coefficient that becomes a normal distribution.

3. The liquid crystal display device according to claim 1, wherein a grayscale distribution of the second image data includes a first region in which luminance is substantially equal to peak luminance of the input image data and second regions on right and left sides of the first region, luminance of the second regions being higher than the peak luminance, and a width in which the first region and the second regions are added is substantially equal to a width of the peak luminance in the grayscale distribution of the second image data.

4. The liquid crystal display device according to claim 1, wherein the correction coefficient calculator includes an extension filtering processor that performs extension filtering on the input image data with a region including a target pixel and pixels around the target pixel as a filter size, a maximum value of luminance in the filter size being set to luminance of the target pixel in the extension filtering.

5. The liquid crystal display device according to claim 1, wherein the correction coefficient calculator includes a second differential filtering processor that performs the differential filtering on the input image data, a second smoothing processor that performs the smoothing processing on the image data subjected to the differential filtering by the second differential filtering processor, a third smoothing processor that performs the smoothing processing on the input image data, an adder that adds a grayscale of the image data subjected to the smoothing processing by the third smoothing processor and a grayscale of the image data subjected to the extension filtering, and a divider that divides the grayscale of the image data added by the adder, by a grayscale of the image data subjected to the smoothing processing by the second smoothing processor, and the correction coefficient calculator sets a calculation result of the divider to the correction coefficient.

6. The liquid crystal display device according to claim 1, further comprising:

a first grayscale decision unit that decides a grayscale of the first image data according to a gamma characteristic of the first display panel based on the input video signal; and a second grayscale decision unit that decides a grayscale of the second image data according to a gamma characteristic of the second display panel based on the input video signal, wherein the first differential filtering processor performs the differential filtering on the image data in which the grayscale is decided by the second grayscale decision unit, the correction coefficient calculator includes a second differential filtering processor that performs the differential filtering on the image data in which the grayscale is decided by the second grayscale decision unit, a second smoothing processor that performs the smoothing processing on the image data subjected to the differential filtering by the second differential filtering processor, a third smoothing processor that performs the smoothing processing on the image data in which the grayscale is decided by the second grayscale decision unit, an extension filtering processor that performs extension filtering on the image data in which the grayscale is decided by the second grayscale decision unit such that a maximum value of luminance in a filter size is set to luminance of a target pixel with a region including a target pixel and pixels around the target pixel as the filter size, an adder that adds the grayscale of the image data subjected to the smoothing processing by the third smoothing processor and the grayscale of the image data subjected to the extension filtering, and a divider that divides the grayscale of the image data added by the adder, by the grayscale of the image data subjected to the smoothing processing by the second smoothing processor, the correction coefficient calculator sets a calculation result of the divider to the correction coefficient, and the first smoothing processor performs the smoothing processing on image data obtained by adding the image data multiplied by the correction coefficient by the multiplier and the image data in which the grayscale is decided by the second grayscale decision unit.

7. The liquid crystal display device according to claim 1, further comprising:

a first grayscale decision unit that decides a grayscale of the first image data according to a gamma characteristic of the first display panel based on the input video signal; and a second grayscale decision unit that decides a grayscale of the second image data according to a gamma characteristic of the second display panel based on the input video signal, wherein the first differential filtering processor performs the differential filtering on the image data in which the grayscale is decided by the second grayscale decision unit, the correction coefficient calculator includes a second differential filtering processor that performs the differential filtering on the image data in which the grayscale is decided by the second grayscale decision unit, a second smoothing processor that performs the smoothing processing on the image data subjected to the differential filtering by the second differential filtering processor, a third smoothing processor that performs the smoothing processing on the image data in which the grayscale is decided by the second grayscale decision unit, an extension filtering processor that performs extension filtering on the image data based on the input video signal before the grayscale is decided by the second grayscale decision unit such that a maximum value of luminance in a filter size is set to luminance of a target pixel with a region including a target pixel and pixels around the target pixel as the filter size, an adder that adds the grayscale of the image data subjected to the smoothing processing by the third smoothing processor and the grayscale of the image data subjected to the extension filtering, and a divider that divides the grayscale of the image data added by the adder, by the grayscale of the image data subjected to the smoothing processing by the second smoothing processor, the correction coefficient calculator sets a calculation result of the divider to the correction coefficient, and the first smoothing processor performs the smoothing processing on image data obtained by adding the image data multiplied by the correction coefficient by the multiplier and the image data in which the grayscale is decided by the second grayscale decision unit.

8. The liquid crystal display device according to claim 1, wherein the smoothing processing is Gaussian filtering.

\* \* \* \* \*